US010833309B2

United States Patent
Takahashi et al.

(10) Patent No.: US 10,833,309 B2
(45) Date of Patent: Nov. 10, 2020

(54) METHOD AND SYSTEM FOR REPLACING ELECTROLYTE SOLUTION OF SECONDARY BATTERY

(71) Applicant: SEMICONDUCTOR ENERGY LABORATORY CO., LTD., Atsugi-shi, Kanagawa-ken (JP)

(72) Inventors: Minoru Takahashi, Nagano (JP); Masaaki Hiroki, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 10 days.

(21) Appl. No.: 15/806,755

(22) Filed: Nov. 8, 2017

(65) Prior Publication Data

US 2018/0069221 A1    Mar. 8, 2018

Related U.S. Application Data

(63) Continuation of application No. 14/136,628, filed on Dec. 20, 2013, now abandoned.

(30) Foreign Application Priority Data

Dec. 28, 2012 (JP) .................................. 2012-287701
Dec. 28, 2012 (JP) .................................. 2012-287874
Mar. 11, 2013 (JP) .................................. 2013-047475

(51) Int. Cl.
*H01M 2/18* (2006.01)
*H01M 2/38* (2006.01)
*H01M 2/40* (2006.01)

(52) U.S. Cl.
CPC .............. *H01M 2/18* (2013.01); *H01M 2/38* (2013.01); *H01M 2/40* (2013.01)

(58) Field of Classification Search
CPC ............ H01M 2/18; H01M 2/36; H01M 2/38; H01M 2/40
(Continued)

(56) References Cited

U.S. PATENT DOCUMENTS 3,159,507 A    12/1964  Abbe et al.
5,135,820 A *  8/1992   Jones ...................... H01M 2/40
                                                  429/49
(Continued)

FOREIGN PATENT DOCUMENTS

CN        001875503 A      12/2006
CN        100502099 C       6/2009
(Continued)

OTHER PUBLICATIONS

Chinese Office Action (Application No. 201310705180.9) dated Jan. 18, 2017.
(Continued)

*Primary Examiner* — Sean P Cullen
(74) *Attorney, Agent, or Firm* — Nixon Peabody LLP; Jeffrey L. Costellia

(57) ABSTRACT

A secondary battery in which convection in an electrolyte solution occurs easily is provided. A secondary battery whose electrolyte solution can be replaced is provided. A nonaqueous secondary battery includes a positive electrode, a negative electrode, a separator, and an electrolyte solution, and the separator includes grooves capable of making convection in the electrolyte solution occur easily. The nonaqueous secondary battery has at least one expected installation direction, and the grooves in the separator are preferably formed so as to be perpendicular to an expected installation surface. The exterior body includes a first opening for injection of an inert gas into the exterior body and a second opening for expelling or injection of an electrolyte
(Continued)

solution from or into the exterior body. An electrolyte solution replacement apparatus has a function of injecting the inert gas through the first opening and expelling or injecting the electrolyte solution through the second opening.

11 Claims, 15 Drawing Sheets

(58) Field of Classification Search
USPC .......................................................... 429/72
See application file for complete search history.

(56) References Cited

U.S. PATENT DOCUMENTS

| | | | |
|---|---|---|---|
| 6,164,309 A * | 12/2000 | Brecht | ............ F16K 15/148 137/14 |
| 6,878,484 B2 | 4/2005 | Tanaka et al. | |
| 7,595,130 B2 | 9/2009 | Kawabata et al. | |
| 2002/0076615 A1 | 6/2002 | Tanaka et al. | |
| 2002/0150813 A1 | 10/2002 | Park et al. | |
| 2008/0187825 A1 | 8/2008 | Kawabata et al. | |
| 2010/0124691 A1 | 5/2010 | Harris | |
| 2010/0205801 A1 | 8/2010 | Farina | |
| 2010/0266878 A1 | 10/2010 | Eilertsen | |
| 2011/0081583 A1 | 4/2011 | Sugimoto et al. | |
| 2011/0287341 A1 | 11/2011 | Inoue et al. | |
| 2011/0300437 A1 | 12/2011 | Yi | |
| 2012/0002349 A1 | 1/2012 | Ito et al. | |

FOREIGN PATENT DOCUMENTS

| | | | |
|---|---|---|---|
| CN | 103066238 A | * | 4/2013 |
| CN | 203039017 U | * | 7/2013 |
| JP | 05-151951 A | | 6/1993 |
| JP | 2002-304979 A | | 10/2002 |
| JP | 2002-319387 A | | 10/2002 |
| JP | 2002-343337 A | | 11/2002 |
| JP | 2004-146238 A | | 5/2004 |
| JP | 2004-179159 A | | 6/2004 |
| JP | 2010-086775 A | | 4/2010 |
| JP | 2011-171013 A | | 9/2011 |
| JP | 2011-253797 A | | 12/2011 |
| JP | 2012-022969 A | | 2/2012 |
| JP | 2012022969 A | * | 2/2012 |
| JP | 2012-209197 A | | 10/2012 |
| KR | 2006-0132556 A | | 12/2006 |
| KR | 2012-0058895 A | | 6/2012 |
| WO | WO-2005/022674 | | 3/2005 |
| WO | WO-2009/131180 | | 10/2009 |
| WO | WO-2012/165358 | | 12/2012 |

OTHER PUBLICATIONS

Chinese Office Action (Application No. 201810078237.X) dated Jun. 1, 2020.

* cited by examiner

FIG. 2A1
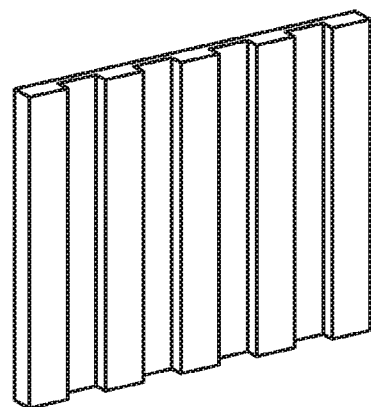
FIG. 2A2
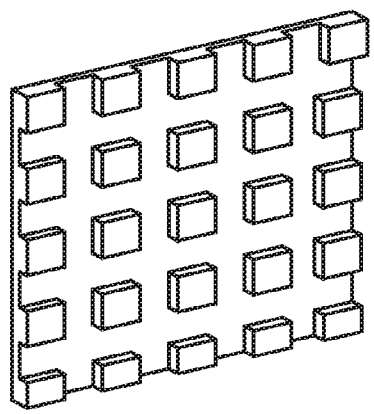
FIG. 2B1
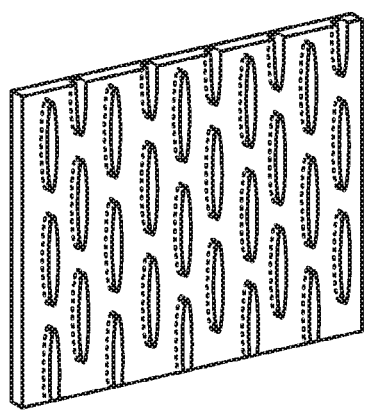
FIG. 2B2
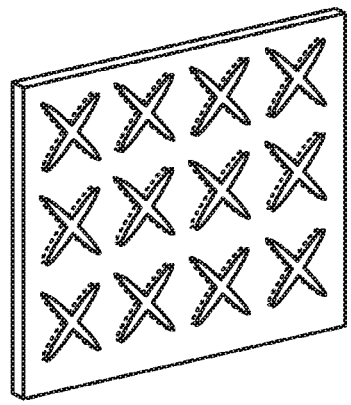
FIG. 2C1
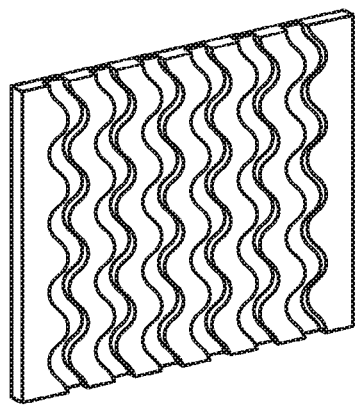
FIG. 2C2
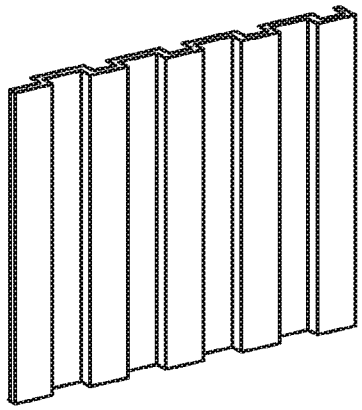

FIG. 3A
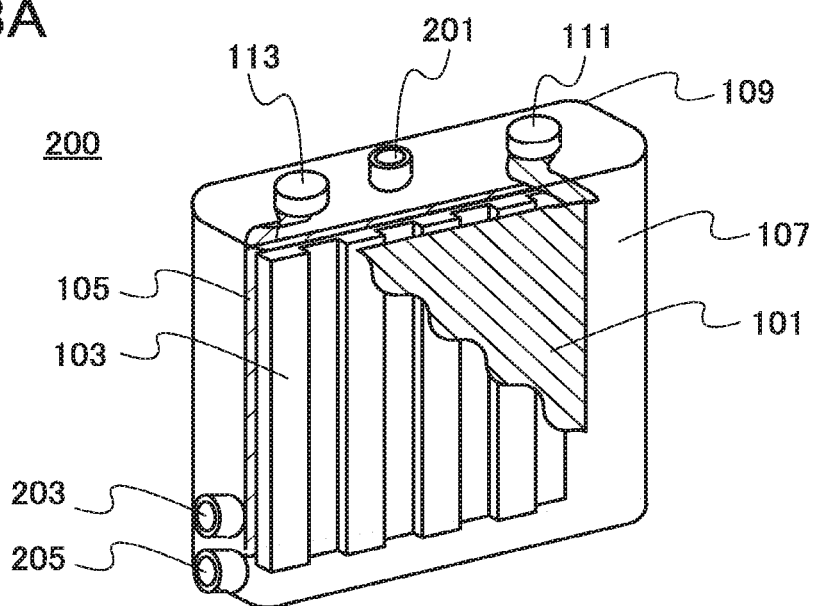
FIG. 3B1
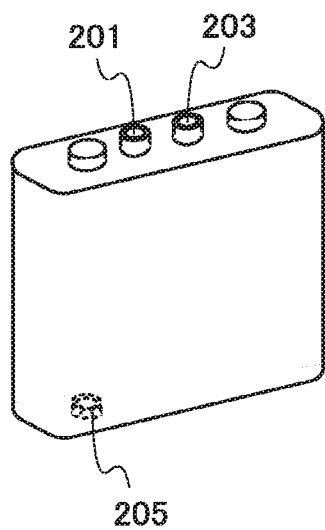
FIG. 3B2
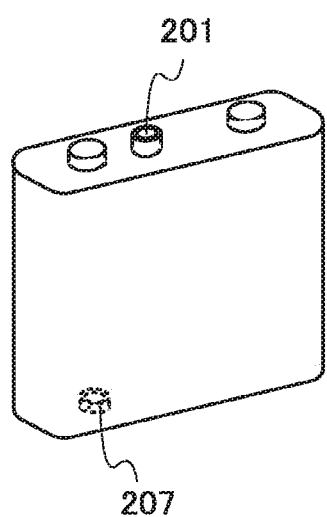
FIG. 3C
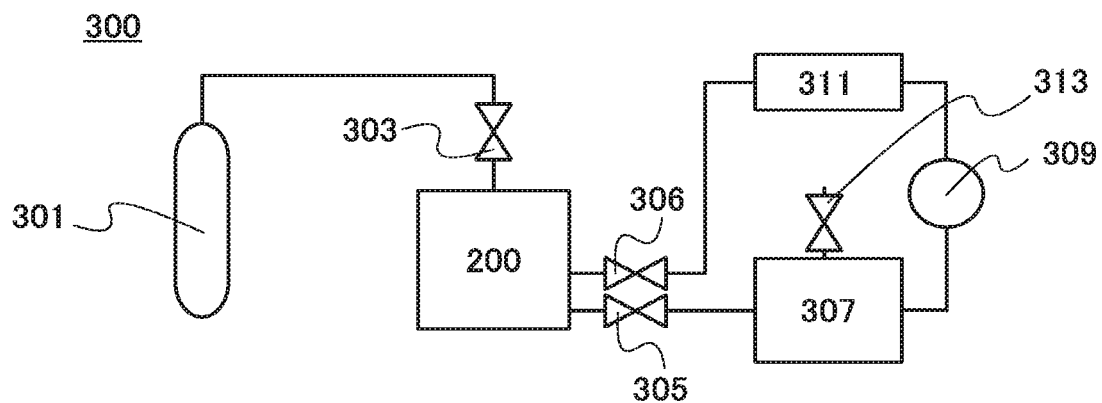

FIG. 14A
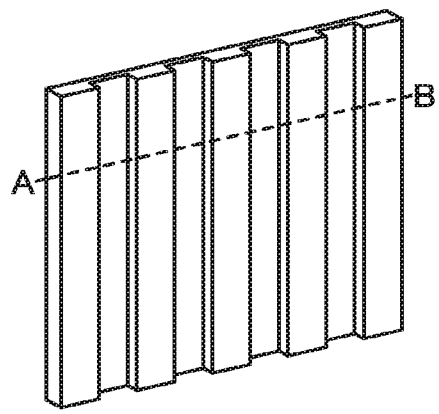
FIG. 14B1
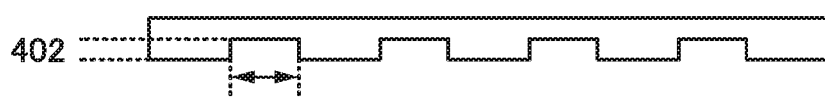
FIG. 14B2
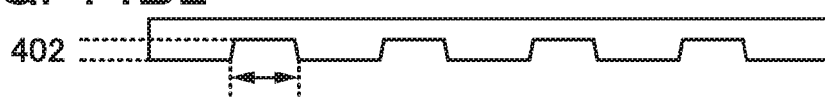
FIG. 14B3
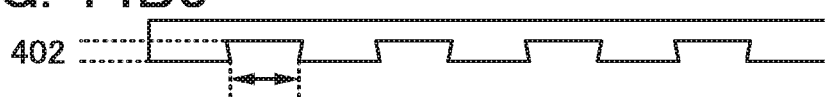
FIG. 14B4
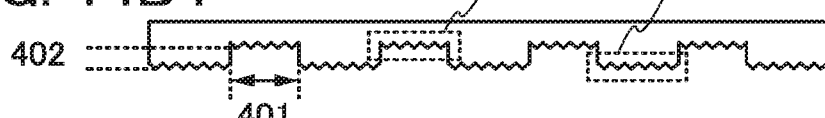
FIG. 14B5
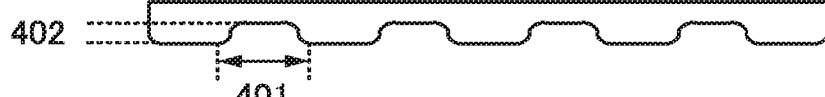
FIG. 14B6
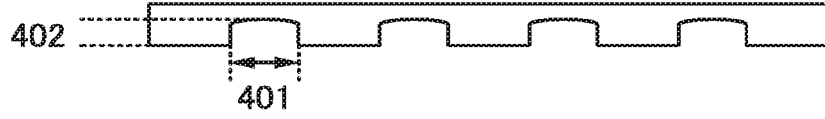

METHOD AND SYSTEM FOR REPLACING ELECTROLYTE SOLUTION OF SECONDARY BATTERY

BACKGROUND OF THE INVENTION

1. Field of the Invention

The present invention relates to an object (a product including a machine, a manufacture, and a composition of matter) and a method (a process including a simple method and a production method). In particular, one embodiment of the present invention relates to a semiconductor device, a display device, a light-emitting device, a secondary battery, a separator, a power storage device, a driving method thereof, or a manufacturing method thereof. In particular, one embodiment of the present invention relates to a nonaqueous secondary battery, a semiconductor device including an oxide semiconductor, and a nonaqueous secondary battery including the semiconductor device.

2. Description of the Related Art

In recent years, a variety of power storage devices, for example, secondary batteries such as lithium-ion secondary batteries, lithium-ion capacitors, air batteries, and fuel batteries have been actively developed (Patent Documents 1 to 3). In particular, demand for lithium-ion secondary batteries with high output and high energy density has rapidly grown with the development of the semiconductor industry and with the growth of demand for energy saving, for electrical devices, for example, portable information terminals such as cellular phones, smartphones, and laptop personal computers, portable music players, and digital cameras; medical equipment; next-generation clean energy vehicles such as hybrid electric vehicles (HEVs), electric vehicles (EVs), and plug-in hybrid electric vehicles (PHEVs); stationary power storage devices; and the like. The lithium-ion secondary batteries are essential for today's information society.

A lithium-ion secondary battery, which is one of nonaqueous secondary batteries, includes a positive electrode, a negative electrode, a separator, a nonaqueous electrolyte solution, and an exterior body covering these components. In lithium-ion secondary batteries, positive electrodes and negative electrodes are generally used; the positive electrodes each include a positive electrode current collector made of aluminum or the like and a positive electrode mix which includes a positive electrode active material capable of occluding and releasing lithium ions and which is applied to both surfaces of the positive electrode current collector, and the negative electrodes each include a negative electrode current collector made of copper or the like and a negative electrode mix which includes a negative electrode active material capable of occluding and releasing lithium ions and which is applied to both surfaces of the negative electrode current collector. These positive and negative electrodes are insulated from each other by a separator provided therebetween, and the positive electrode and the negative electrode are electrically connected to a positive electrode terminal and a negative electrode terminal, respectively, which are provided on the exterior body. The exterior body has a certain shape such as a cylindrical shape or a rectangular shape.

REFERENCES

[Patent Document 1] PCT International Publication No. WO2012/165358
[Patent Document 2] United States Patent Application. Publication. No. 2012/0002349
[Patent Document 3] PCT International Publication No. WO2009/131180

SUMMARY OF THE INVENTION

It is highly demanded that in-vehicle secondary batteries for HEVs, EVs, PHEVs, and the like and stationary secondary batteries among secondary batteries for a variety of uses have higher output. En order to increase the output of a secondary battery, it is necessary to improve the capability of an electrolyte solution to transfer lithium ions as well as to decrease the resistances of positive and negative electrodes. In addition, it is necessary for the secondary battery to release excessive heat as appropriate because the amount of heat generated by charge-discharge reaction increases as the output increases.

At the same time, it is highly demanded that lithium-ion secondary batteries have longer lifetime, and it is necessary to take measures against deterioration of an electrolyte solution as well as deterioration of positive and negative electrodes.

In view of the above objects, an object of one embodiment of the present invention is to provide a secondary battery or the like in which convection in an electrolyte solution occurs easily. Another object is to provide a secondary battery whose electrolyte solution can be replaced. Another object is to provide a secondary battery with high output. Another object is to provide a secondary battery or the like with long lifetime. Another object is to provide a novel secondary battery or the like. Another object is to provide a secondary battery or the like with excellent characteristics. Another object of one embodiment of the present invention is to provide a semiconductor device or the like with low off-state current. Another object of one embodiment of the present invention is to provide a semiconductor device or the like with low power consumption. Another object of one embodiment of the present invention is to provide a semiconductor device or the like including a transparent semiconductor layer. Another object of one embodiment of the present invention is to provide a semiconductor device or the like including a semiconductor layer with high reliability. Another object of one embodiment of the present invention is to provide a separator capable of extending the lifetime of a secondary battery. Another object of one embodiment of the present invention is to provide a separator capable of improving the characteristics of a secondary battery.

Note that the descriptions of these objects do not disturb the existence of other objects. Note that in one embodiment of the present invention, there is no need to achieve all the objects. Other objects will be apparent from and can be derived from the description of the specification, the drawings, the claims, and the like.

One embodiment of the present invention is a nonaqueous secondary battery including a positive electrode, a negative electrode, a separator, and an electrolyte solution, in which the separator includes a groove capable of making convection in the electrolyte solution occur easily.

Another embodiment of the present invention is a secondary battery including a positive electrode, a negative electrode, an electrolyte solution, and a separator, in which the separator at least partly includes a groove parallel to the positive electrode and the negative electrode.

Another embodiment of the present invention is a nonaqueous secondary battery including a positive electrode, a negative electrode, an electrolyte solution, a separator, an exterior body, and an electrolyte solution replacement apparatus. The positive electrode, the negative electrode, the electrolyte solution, and the separator are provided inside the exterior body. The exterior body includes a first opening for injection of an inert gas into the exterior body and a second opening for expelling or injection of the electrolyte solution from or into the exterior body. The electrolyte solution replacement apparatus has a function of injecting the inert gas through the first opening and expelling or injecting the electrolyte solution through the second opening.

In accordance with one embodiment of the present invention, a secondary battery in which convection in an electrolyte solution occurs easily can be provided. A secondary battery whose electrolyte solution can be replaced can be provided. A secondary battery with high output can be provided. A secondary battery with long lifetime can be provided. A novel secondary battery can be provided. A secondary battery with excellent characteristics can be provided.

BRIEF DESCRIPTION OF THE DRAWINGS

FIGS. 2A1, 2A2, 2B1, 2B2, 2C1, and 2C2 each illustrate a separator used in a secondary battery in one embodiment of the present invention.
FIGS. 3A, 3B1, 3B2, and 3C illustrate a secondary battery in one embodiment of the present invention.
FIG. 14A illustrate a separator in one embodiment of the present invention and FIGS. 14B1 to 14B6 each illustrate a cross-sectional view of the separator.

DETAILED DESCRIPTION OF THE INVENTION

Figure 1A:
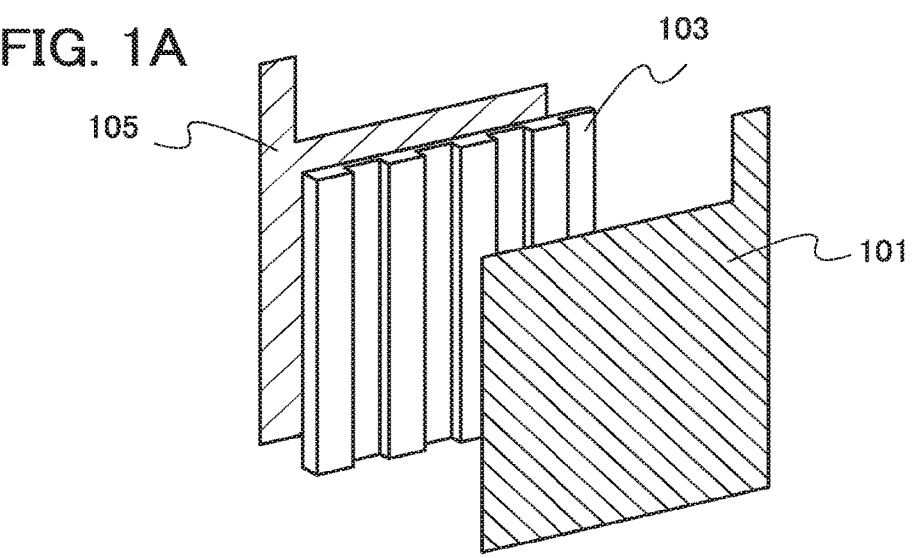
FIGS. 1A to 1C illustrate a secondary battery in one embodiment of the present invention.

Embodiments of the present invention will be described in detail below with reference to the drawings. Note that embodiments of the present invention are described in the following order.
1. Secondary battery including separator with grooves
1.1. Structure example of secondary battery
1.2. Example of separator
2. Electrolyte solution replacement system for secondary battery
3. Secondary battery
3.1. Positive electrode
3.2. Negative electrode
3.3. Electrolyte solution
3.4. Separator
3.5. Nonaqueous secondary battery
3.5.1. Laminated secondary battery
3.5.2. Rectangular secondary battery
3.5.3. Cylindrical secondary battery
3.6. Lithium-ion capacitor
3.7. Secondary battery including electrical circuit and the like
4. Electrical device
4.1. Range of electrical device
4.2. Examples of electrical device
4.3. Example of electric power network
4.4. Example of electrical device (Example of electric vehicle)
4.5. Example of electrical device (Example of portable information terminal)
4.6. Example of electrical device (Example of power storage system)

Note that the present invention is not limited to the description in these embodiments, and it is easily understood by those skilled in the art that modes and aspects of the present invention can be modified in various ways. Therefore, the present invention should not be construed as being limited to the description in the following embodiments.

Note that in each drawing described in this specification, the size of each component, such as the thickness of a film, a layer, a substrate, or the like or the size of a region is exaggerated for clarity in some cases. Therefore, each component is not necessarily limited to that size and not necessarily limited in size relative to another component.

Note that ordinal numbers such as "first" and "second" in this specification and the like are used for convenience and do not denote the order of steps, the stacking order of layers, and the like. In addition, the ordinal numbers in this specification and the like do not denote any particular names to define the invention.

Note that in the structures of the present invention described in this specification and the like, the same portions or portions having similar functions in different drawings are denoted by the same reference numerals, and description of such portions is not repeated. Further, the same hatch pattern is applied to parts having similar functions, and the parts are not especially denoted by reference numerals in some cases.

Note that in this specification and the like, a positive electrode and a negative electrode for a secondary battery may be collectively referred to as an electrode; the electrode in this case refers to at least one of the positive electrode and the negative electrode.

The term "over" or "under" in this specification and the like does not necessarily mean that a component is placed "directly on and above" or "directly on and below" another component.

A voltage refers to a potential difference between a given potential and a reference potential (e.g., a ground potential GND or a source potential) in many cases. Accordingly, a voltage can be referred to as a potential.

The term such as "electrode" or "wiring" in this specification and the like does not limit a function of a component. For example, an "electrode" can be used as part of a "wiring", and the "wiring" can be used as part of the "electrode". Furthermore, the term "electrode" or "wiring" can include the case where a plurality of "electrodes" or "wirings" are formed in an integrated manner.

Note that a connection in this specification and the like includes an electrical connection, a functional connection, and a direct connection. A connection relation of components shown in embodiments is not limited to the connection relation illustrated in the drawings and described in the specification.

Note that it might be possible for those skilled in the art to construct one embodiment of the invention even when all the portions to which terminals of an active element (e.g., a transistor or a diode), a passive element (e.g., a capacitor or a resistor), or the like are connected are not specified. In other words, even when such portions are not specified, one aspect of the present invention can be clear and it can be determined that one aspect of the present invention is disclosed in this specification and the like in some cases. In particular, in the case where the number of portions to which a terminal can be connected is plural, it is not necessary to specify a portion to which the terminal is connected. Therefore, it might be possible to construct one embodiment of the invention by specifying only portions to which some of terminals of an active element (e.g., a transistor or a diode), a passive element (e.g., a capacitor or a resistor), or the like are connected.

Note that in this specification and the like, it might be possible for those skilled in the art to specify the invention when at least a connection of a circuit is specified. Further, it might be possible for those skilled in the art to specify the invention when at least a function of a circuit is specified. In other words, when a function of a circuit is specified, one aspect of the present invention can be clear and can be regarded as being disclosed in this specification and the like in some cases. Therefore, when a connection of a circuit is specified, the circuit is regarded as being disclosed as one embodiment of the invention even when a function is not specified, and one embodiment of the invention can be constructed. Alternatively, when a function of a circuit is specified, the circuit is regarded as being disclosed as one embodiment of the invention even when a connection is not specified, and one embodiment of the invention can be constructed.

The descriptions in embodiments for carrying out the invention can be combined with each other as appropriate.

[1. Secondary Battery Including Separator with Grooves]

[1.1. Structure Example of Secondary Battery]

An example of a nonaqueous secondary battery in one embodiment of the present invention is described with reference to FIGS. 1A to 1C and FIGS. 2A1, 2A2, 2B1, 21B2, 2C1, and 2C2.

Figure 1B:
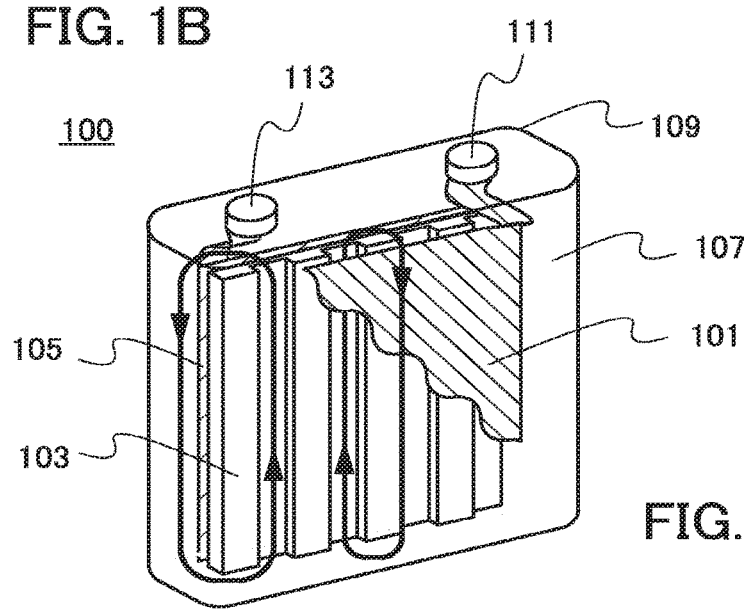
Figure 1C:
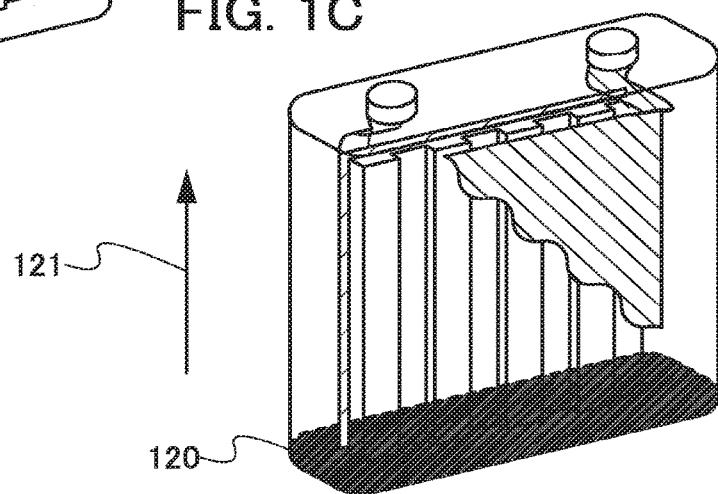

FIG. 1A illustrates a positive electrode 101, a negative electrode 105, and a separator 103 between the positive electrode 101 and the negative electrode 105. The positive electrode 101 and the negative electrode 105 are perpendicular to an installation surface. In one embodiment of the present invention, the separator 103 has grooves perpendicular to the installation surface as illustrated in FIG. 1A. Although FIGS. 1A to 1C illustrate an example in which the cross-section of the groove has a rectangular shape, the cross-section of the groove may have a curved shape, a V shape, or a trapezoidal shape. FIGS. 14B1 to 14B6 each illustrate an example of a cross-section taken along the line A-B in FIG. 14A and a width 401 and a depth 402 of a groove.

FIG. 1B illustrates a secondary battery 100 including the positive electrode 101, the separator 103, and the negative electrode 105 in FIG. 1A. The secondary battery 100 further includes an electrolyte solution 107 and an exterior body 109 in addition to the positive electrode 101, the separator 103, and the negative electrode 105. The exterior body 109 includes a terminal 111 and a terminal 113. The positive electrode 101, the separator 103, the negative electrode 105, and the electrolyte solution 107 are enclosed by the exterior body 109. The positive electrode 101 is electrically connected to the terminal 111, and the negative electrode 105 is electrically connected to the terminal 113. A bottom surface 120 illustrated in FIG. 1C is in contact with the installation surface. A direction 121 illustrated in FIG. 1C indicates a direction perpendicular to the installation surface.

The secondary battery 100 is expected to be installed such that the largest surfaces of the positive electrode 101 and the negative electrode 105 are perpendicular to the installation surface (or the ground), i.e., substantially parallel to the gravity direction. For example, the secondary battery 100 may be installed as illustrated in FIG. 1B or installed upside down.

In order to increase the output of the secondary battery 100, the capability of the electrolyte solution 107 to transfer carrier ions (lithium ions) should be improved. In other words, the concentration of ions that can be supplied to a surface of an active material per unit time should be increased. By a battery reaction, in the case where lithium ions are supplied to an active material, for example, the concentration of lithium ions at the surface is decreased. This concentration decrease should be compensated for in order to increase output. Furthermore, heat is generated from the positive electrode 101 and the negative electrode 105 by charge and discharge of the secondary battery 100. As the capacity or output of the secondary battery 100 increases, the amount of heat generation increases; excessive heat might accelerate deterioration of the electrolyte solution.

The secondary battery 100 including the separator 103 having grooves as illustrated in FIGS. 1A to 1C is effective in improving the capability to transfer lithium ions or in releasing heat. The grooves in the separator 103 promote convection in the electrolyte solution as indicated by arrows in FIG. 1B, for example. The convection in the electrolyte solution can be expected to have the effect of equalizing the concentration of lithium ions in the electrolyte solution and increasing the concentration of ions which can be supplied to a surface of an active material. Specifically, the electrolyte solution heated by the positive electrode 101 and the negative electrode 105 moves upward along the grooves in the separator 103 to the vicinity of the exterior body 109. The electrolyte solution 107 in the vicinity of the exterior body 109 is cooled down and moves downward along the exterior body 109. In other words, the grooves in the separator 103 serve as flow paths for the electrolyte solution.

By promotion of convection in the electrolyte solution 107 in the above manner, the capability to transfer lithium ions can be improved. Accordingly, the secondary battery 100 can have high output. In addition, by promotion of convection in the electrolyte solution 107, the release of heat is promoted. Accordingly, deterioration of the electrolyte solution can be suppressed.

In lithium-ion secondary batteries, a lithium metal is generally deposited at an electrode (mainly the negative electrode 105), which might cause a short-circuit between the positive electrode 101 and the negative electrode 105 or a decrease in capacity due to separation. However, with the above-described structure, deposition of a lithium metal can be suppressed. Accordingly, the risk of the short-circuit between the positive electrode 101 and the negative electrode 105 can be reduced.

In some cases, a gas may be generated by decomposition of the electrolyte solution at the electrode surface. If the generated gas remains at the electrode surface, the electrolyte solution, i.e., lithium ions, cannot be supplied to that portion and a battery reaction cannot be caused, which results in a decrease in capacity. The grooves can suppress the decrease in capacity because the generated gas can escape to the grooves or the gas can move away from the electrode along the grooves.

[1.2. Example of Separator]

FIGS. 2A1, 2A2, 2B1, 2B2, 2C1, and 2C2 illustrate examples of shapes of the separator 103.

A separator in FIG. 2A1 is described. As described with reference to FIGS. 1A to 1C, the largest surfaces of the positive electrode 101 and the negative electrode 105 are placed perpendicular to the installation surface (or the ground), i.e., substantially parallel to the gravity direction. The separator 103 is placed parallel to the positive electrode 101 and the negative electrode 105. The separator 103 illustrated in FIG. 2A1 is placed perpendicular to the ground, and the grooves are formed therein so as to be perpendicular to the ground. Although the separator 103 in FIGS. 1A to 1C is described as having the perpendicular grooves as in FIG. 2A1, one embodiment of the present invention is not limited to this example.

The separator 103 may have parallel grooves as well as the perpendicular grooves as illustrated in FIG. 2A2. Here, the term "parallel" means a direction at an angle of substantially 90° to the perpendicular grooves.

Figure 15:
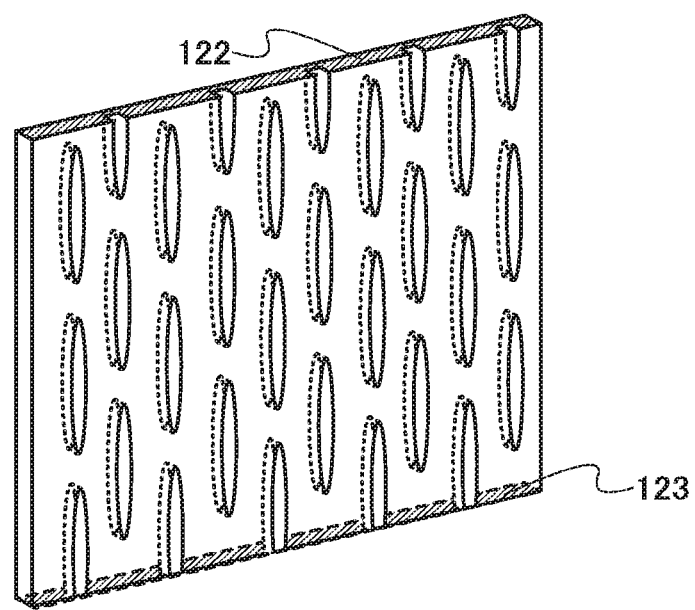
FIG. 15 illustrates a separator in one embodiment of the present invention.

The separator 103 may have depressed portions as illustrated in FIGS. 2B1 and 2B2. In FIGS. 2B1 and 2B2, depressed portions are formed in a disconnected manner. Here, the phrase "in a disconnected manner" means that depressed portions are not continuously connected from one of upper and lower edge portions of the separator to the other edge portion. Such depressed portions can increase the strength of the separator, for example. FIG. 15 shows edge portions of the separator illustrated in FIG. 2B1. The separator has an upper edge portion 122 and a lower edge portion 123.

The separator 103 may have serpentine grooves as illustrated in FIG. 2C1.

The separator 103 may have grooves on both sides as illustrated in FIG. 2C2.

The separator may have any combination of the above features.

Note that the grooves or depressed portions of the separator 103, i.e., the flow paths for the electrolyte solution 107, are preferably formed so as to be perpendicular to an expected installation direction of the secondary battery 100, in which case the grooves or depressed portions are more effective in promoting convection. In other words, the grooves or depressed portions are preferably formed so as to be perpendicular to the installation surface.

Although FIGS. 1A to 1C and FIGS. 2A1, 2A2, 2B1, 2B2, 2C1, and 2C2 illustrate examples in which the separator 103 is provided with grooves or depressed portions, one embodiment of the present invention is not limited to these examples. In some cases or depending on the situation, the separator 103 may have a flat plate shape without grooves or depressed portions.

The separator preferably has holes or openings through which the electrolyte solution can pass. In the case of the holes, the size of each hole is preferably greater than or equal to 5 nm and less than or equal to 10 μm. The separator may be in a fibrous form. The thickness of the separator is preferably greater than or equal to 100 nm and less than or equal to 1 mm, more preferably greater than or equal to 1 μm and less than or equal to 300 μm, further preferably greater than or equal to 3 μm and less than or equal to 50 μm.

Here, the separator illustrated in FIG. 2A1 is described in detail as an example for describing the size of grooves and the interval between the grooves. The grooves are deep enough for a gas to pass through. The depth of the groove in the separator illustrated in FIG. 2A1 is preferably greater than or equal to 10% and less than or equal to 80%, more preferably greater than or equal to 30% and less than or equal to 50%, of the thickness of the separator. The width of the groove in the separator is preferably greater than or equal to 50 μm and less than or equal to 50 mm. The width of the groove refers to a distance between upper edge portions of side surfaces of the groove. The interval between the grooves is preferably 1 to 10 times the width of the groove.

Note that the separator may have a slightly uneven surface; therefore, a depression that is less than or equal to 5% of the thickness of the separator is not regarded as a groove. Furthermore, for example, in the case where a depressed surface 403 in the groove or a surface 404 outside the groove is slightly uneven as illustrated in FIG. 14B4, the depth of the groove and the thickness of the separator are defined using an average height of the unevenness of the surface.

[2. Electrolyte Solution Replacement System for Secondary Battery]

In this embodiment, another example of a nonaqueous secondary battery in one embodiment of the present invention is described with reference to FIGS. 3A, 3B1, 3B2, and 3C.

FIG. 3A illustrates a secondary battery 200 including the positive electrode 101, the separator 103, the negative electrode 105, the electrolyte solution 107, and the exterior body 109. The positive electrode 101, the separator 103, the negative electrode 105, and the electrolyte solution 107 are enclosed by the exterior body 109.

The exterior body 109 includes the terminal 111, the terminal 113, a gas injection and expelling opening 201, an electrolyte solution injection opening 203, and an electrolyte solution expelling opening 205. The gas injection and expelling opening 201 is used to inject and expel a gas. The electrolyte solution injection opening 203 is used to inject an electrolyte solution. The electrolyte solution expelling opening 205 is used to expel an electrolyte solution.

The positive electrode 101 is electrically connected to the terminal 111, and the negative electrode 105 is electrically connected to the terminal 113.

The electrolyte solution 107 of the secondary battery 200 can be replaced. For example, the secondary battery 200 allows a gas to be injected into the exterior body 109 through the gas injection and expelling opening 201 and allows an electrolyte solution to be expelled through the electrolyte solution expelling opening 205. In addition, an electrolyte solution can be injected through the electrolyte solution injection opening 203, and a gas can be expelled through the gas injection and expelling opening 201.

By replacement of the electrolyte solution 107 of the secondary battery 200, an electrolyte solution which has deteriorated can be reused after filtration or the like. The filtration or the like is not necessarily performed, and a new electrolyte solution may be injected. By replacement of the electrolyte solution 107, the lifetime of the secondary battery 200 can be extended.

Note that as the gas injected into the exterior body 109, an inert gas is preferably used in order to prevent deterioration of the positive electrode 101 and the negative electrode 105. Examples of inert gases include a nitrogen gas, a carbon dioxide gas, an argon gas, and the like. Among these gases, a nitrogen gas is preferable for its inexpensiveness.

Although an example is described with reference to FIG. 3A in which the gas injection and expelling opening 201 is provided on an upper surface of the exterior body 109 and the electrolyte solution injection opening 203 and the electrolyte solution expelling opening 205 are provided on a side surface of the exterior body 109, one embodiment of the present invention is not limited to this example.

For example, as in FIG. 3B1, the gas injection and expelling opening 201 and the electrolyte solution injection opening 203 may be provided on the upper surface of the exterior body 109 and the electrolyte solution expelling opening 205 may be provided on a lower surface of the exterior body 109. In the case where the electrolyte solution expelling opening 205 is provided on the lower surface of the exterior body 109, the electrolyte solution can be expelled easily.

As in FIG. 3B2, the exterior body 109 may be provided with an electrolyte solution injection and expelling opening 207 which serves as both the electrolyte solution injection opening 203 and the electrolyte solution expelling opening 205.

Next, FIG. 3C illustrates an example of an electrolyte solution replacement system 300 for the secondary battery 200. The electrolyte solution replacement system 300 includes a tank 301, a server 307, a pump 309, and a filter 311.

When the electrolyte solution 107 of the secondary battery 200 needs to be replaced because of deterioration, the tank 301 is connected to the gas injection and expelling opening 201 of the secondary battery 200. The electrolyte solution expelling opening 205 is connected to the server 307. The electrolyte solution injection opening 203 is connected to the filter 311. These connections are made via respective valves 303, 305, and 306. The valve 305 connecting the electrolyte solution expelling opening 205 and the server 307 and the valve 306 connecting the electrolyte solution injection opening 203 and the filter 311 are preferably one-way valves in order to prevent the electrolyte solution from flowing backward. The server 307 is preferably provided with a valve 313 for pressure adjustment.

The electrolyte solution 107 can be replaced in the following manner, for example. First, a gas in the tank 301 is injected into the exterior body 109, so that the electrolyte solution 107 in the exterior body 109 is expelled to the server 307. The electrolyte solution expelled to the server 307 passes through the filter 311 via the pump 309. The filter 311 can remove an unnecessary substance (e.g., particles which are separated from the positive electrode 101 or the negative electrode 105 and do not contribute to charge and discharge, a polymerized substance of an organic solvent included in the electrolyte solution, or the like) from an electrolyte solution which has deteriorated. After passing through the filter 311, the electrolyte solution is injected into the exterior body 109 again. The gas in the exterior body 109 at this time is expelled through the gas injection and expelling opening 201.

Although the system in which the electrolyte solution having passed through the filter 311 is returned to the secondary battery 200 is described with reference to FIG. 3C, one embodiment of the present invention is not limited to this example. The electrolyte solution having passed through the filter 311 may be injected into the exterior body 109 after being mixed with a new electrolyte solution, a new electrolyte, or a new solvent.

The electrolyte solution replacement system does not necessarily include the filter 311; for example, an expelled electrolyte solution may be disposed of and a new electrolyte solution may be injected into the exterior body 109.

[3. Secondary Battery]

In this section, examples of materials, structures, and the like which can be used for the positive electrode, the negative electrode, the electrolyte solution, the separator, and the secondary battery described with reference to FIGS. 1A to 1C, FIGS. 2A1, 2A2, 2B1, 2B2, 2C1, and 2C2, and FIGS. 3A, 3B1, 3B2, and 3C are described below.

[3.1. Positive Electrode]

Figure 4A:
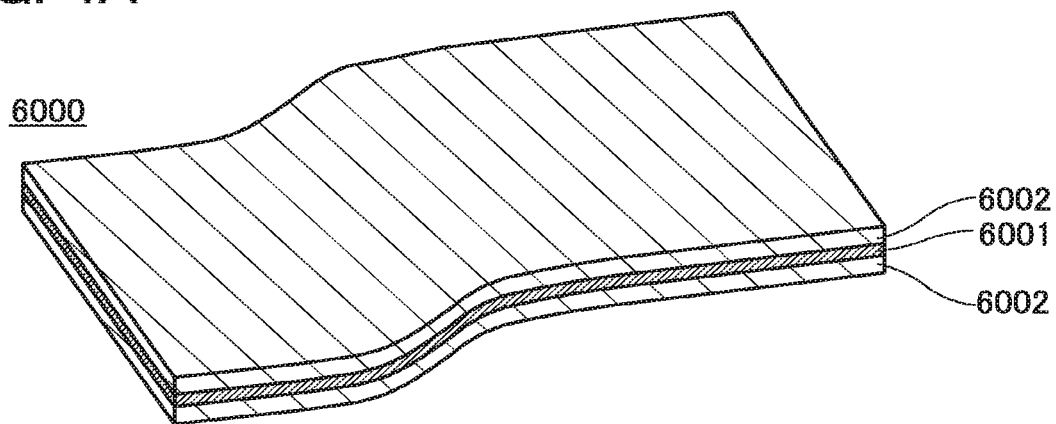
FIGS. 4A and 4B illustrate a positive electrode.

First, a positive electrode of a secondary battery is described with reference to FIGS. 4A and 4B.

A positive electrode 6000 includes a positive electrode current collector 6001, a positive electrode active material layer 6002 formed over the positive electrode current collector 6001 by a method such as a coating method, a CVD method, or a sputtering method, and the like. Although an example of providing the positive electrode active material layer 6002 on both sides of the positive electrode current collector 6001 with a sheet shape (or a strip-like shape) is illustrated in FIG. 4A, one embodiment of the present invention is not limited to this example. The positive electrode active material layer 6002 may be provided on one side of the positive electrode current collector 6001. Further, although the positive electrode active material layer 6002 is provided entirely over the positive electrode current collector 6001 in FIG. 4A, one embodiment of the present invention is not limited thereto. The positive electrode active material layer 6002 may be provided over part of the positive electrode current collector 6001. For example, a structure may be employed in which the positive electrode active material layer 6002 is not provided in a portion where the positive electrode current collector 6001 is connected to a terminal.

The positive electrode current collector 6001 can be formed using a highly conductive material which is not alloyed with a carrier ion of lithium or the like, such as a metal typified by gold, platinum, aluminum, or titanium, or an alloy thereof (typified by stainless steel). Alternatively, an aluminum alloy to which an element which improves heat resistance, such as silicon, titanium, neodymium, scandium, or molybdenum, is added can be used. The positive electrode current collector 6001 can have a foil-like shape, a plate-like shape (sheet-like shape), a net-like shape, a punching-metal shape, an expanded-metal shape, or the like as appropriate. The positive electrode current collector 6001 preferably has a thickness of greater than or equal to 10 μm and less than or equal to 30 μm.

Figure 4B:
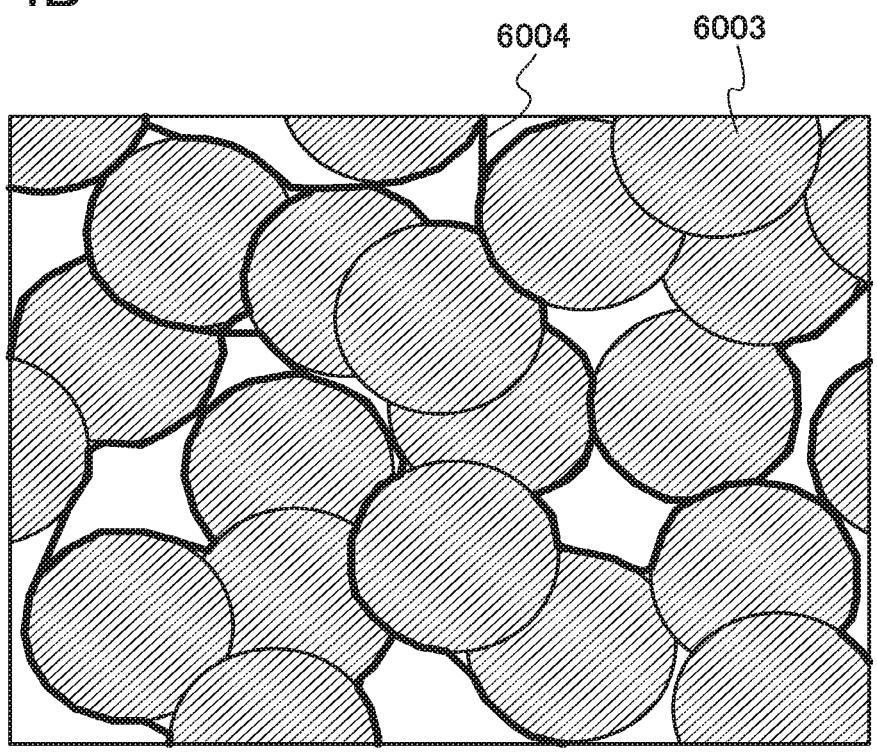

FIG. 4B is a schematic view illustrating the longitudinal cross-sectional view of the positive electrode active material layer 6002. The positive electrode active material layer 6002 includes particles of a positive electrode active material 6003, graphenes 6004 as a conductive additive, and a binder (also referred to as a binding agent) (not illustrated).

Examples of the conductive additive are acetylene black (AB), ketjen black, graphite (black lead) particles, and carbon nanotubes in addition to graphene described later. Here, the positive electrode active material layer 6002 using the graphene 6004 is described as an example.

The positive electrode active material 6003 is in the form of particles made of secondary particles with average diameter or diameter distribution, which are obtained in such a way that material compounds are mixed at a predetermined ratio and baked and the resulting baked product is crushed, granulated, and classified by an appropriate means. Therefore, the positive electrode active material 6003 is schematically illustrated as spheres in FIG. 4B; however, the shape of the positive electrode active material 6003 is not limited to this shape.

For the positive electrode active material 6003, a material into and from which carrier ions such as lithium ions can be inserted and extracted is used.

For example, an olivine-type lithium-containing complex phosphate ($LiMPO_4$ (general formula) (M is one or more of Fe(II), Mn(II), Co(II), and Ni(II))) can be used. Typical examples of $LiMPO_4$ (general formula) which can be used as a positive electrode active material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hMn_iPO_4$ (f+g+h+i≤1, 0<f<1, 0<g<1, 0<h<1, and 0<i<1).

Alternatively, a complex silicate such as $Li_{(2-j)}MSiO_4$ (general formula) (M is one or more of Fe(II), Mn(II), Co(II), and Ni(II); 0≤j≤2) may be used. Typical examples of $Li_{(2-j)}MSiO_4$ (general formula) which can be used as a positive electrode active material are compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

A compound with a layered rock-salt crystal structure may be used, examples of which include a lithium cobalt oxide ($LiCoO_2$), $LiNiO_2$, $LiMnO_2$, $Li_2MnO_3$, a NiCo-based oxide (general formula: $LiNi_xCo_{1-x}O_2$ (0<x<1)) such as $LiNi_{0.8}Co_{0.2}O_2$, a NiMn-based oxide (general formula: $LiNi_xMn_{1-x}O_2$ (0<x<1)) such as $LiNi_{0.5}Mn_{0.5}O_2$, a NiMnCo-based oxide (also referred to as NMC) (general formula: $LiNi_xMn_yCo_{1-x-y}O_2$ (x>0, y>0, x+y<1)) such as $LiNi_{1/3}Mn_{1/3}Co_{1/3}O_2$, and the like.

Further alternatively, for the positive electrode active material 6003, any of various compounds other than the above, for example, an active material having a spinel crystal structure such as $LiMn_2O_4$ and an active material having an inverse spinel crystal structure such as $LiMVO_4$ can be used.

In the case where carrier ions are alkali metal ions other than lithium ions or alkaline-earth metal ions, the following may be used as the positive electrode active material 6003: a compound or an oxide which is obtained by substituting an alkali metal (e.g., sodium or potassium) or an alkaline-earth metal (e.g., calcium, strontium, barium, beryllium, or magnesium) for lithium in any of the above-mentioned compounds or oxides.

Note that although not illustrated, a carbon layer may be provided on a surface of the positive electrode active material 6003. With a carbon layer, conductivity of an electrode can be increased. The positive electrode active material 6003 can be coated with the carbon layer by mixing a carbohydrate such as glucose at the time of baking the positive electrode active material.

In addition, the graphene 6004 which is added to the positive electrode active material layer 6002 as a conductive additive can be formed by performing reduction treatment on graphene oxide.

Here, graphene in this specification includes single-layer graphene and multilayer graphene including two to a hundred layers. Single-layer graphene refers to a one-atom-thick sheet of carbon molecules having it bonds. Graphene oxide refers to a compound formed by oxidizing the graphene. When graphene oxide is reduced to form graphene, oxygen contained in the graphene oxide is not entirely released and part of the oxygen remains in the graphene. When the graphene contains oxygen, the proportion of the oxygen, which is measured by XPS, is higher than or equal to 2 at. % and lower than or equal to 20 at. % of the whole graphene, preferably higher than or equal to 3 at. % and lower than or equal to 15 at. % of the whole graphene.

In the case where graphene is multilayer graphene including graphene obtained by reducing graphene oxide, the interlayer distance between graphenes is greater than or equal to 0.34 nm and less than or equal to 0.5 nm, preferably greater than or equal to 0.38 nm and less than or equal to 0.42 nm, more preferably greater than or equal to 0.39 nm and less than or equal to 0.41 nm. In general graphite, the interlayer distance between single-layer graphenes is 0.34 nm. Since the interlayer distance between the graphenes used for the secondary battery of one embodiment of the present invention is longer than that in general graphite, carrier ions can easily transfer between the graphenes in multilayer graphene.

Graphene oxide can be formed by an oxidation method called a Hummers method, for example.

The Hummers method is as follows: a sulfuric acid solution of potassium permanganate, a hydrogen peroxide solution, and the like are mixed into a graphite powder to cause an oxidation reaction; thus, a dispersion liquid including graphite oxide is formed. Through the oxidation of carbon in graphite, functional groups such as an epoxy group, a carbonyl group, a carboxyl group, or a hydroxyl group are bonded in the graphite oxide. Accordingly, the interlayer distance between a plurality of graphenes in the graphite oxide is longer than that in the graphite, so that the graphite oxide can be easily separated into thin pieces by interlayer separation. Then, ultrasonic vibration is applied to the mixed solution containing the graphite oxide, so that the graphite oxide whose interlayer distance is long can be cleaved to separate graphene oxide and to form a dispersion liquid containing graphene oxide. The solvent is removed from the dispersion liquid including the graphene oxide, so that powdery graphene oxide can be obtained.

Note that the method for forming graphene oxide is not limited to the Hummers method using a sulfuric acid solution of potassium permanganate; for example, the Hummers method using nitric acid, potassium chlorate, nitric acid sodium, potassium permanganate, or the like or a method for forming graphene oxide other than the Hummers method may be employed as appropriate.

Graphite oxide may be separated into thin pieces by application of ultrasonic vibration, by irradiation with microwaves, radio waves, or thermal plasma, or by application of physical stress.

The formed graphene oxide includes an epoxy group, a carbonyl group, a carboxyl group, a hydroxyl group, or the like. In graphene oxide, oxygen in a functional group is negatively charged in a polar solvent typified by NMP (also referred to as N-methylpyrrolidone, 1-methyl-2-pyrrolidone, N-methyl-2-pyrrolidone, or the like); therefore, while interacting with NMP, the graphene oxide repels other graphene oxides and is hardly aggregated. For this reason, in a polar solvent, graphene oxides can be easily dispersed uniformly.

The length of one side (also referred to as a flake size) of the graphene oxide is greater than or equal to 50 nm and less than or equal to 100 μm, preferably greater than or equal to 800 nm and less than or equal to 20 μm.

As in the cross-sectional view of the positive electrode active material layer 6002 in FIG. 4B, the particles of the positive electrode active material 6003 are coated with the plurality of graphenes 6004. The sheet-like graphene 6004 is connected to the particles of the positive electrode active material 6003. In particular, since the graphenes 6004 are in the form of a sheet, surface contact can be made in such a way that part of surfaces of the particles of the positive electrode active material 6003 is wrapped with the graphenes 6004. Unlike a conductive additive in the form of particles, such as acetylene black, which makes point contact with a positive electrode active material, the graphenes 6004 are capable of surface contact with low contact resistance; accordingly, the electron conductivity of the particles of the positive electrode active material 6003 and the graphenes 6004 can be improved without an increase in the amount of a conductive additive.

Further, surface contact is made between the plurality of graphenes 6004. This is because the graphene oxides with extremely high dispersibility in a polar solvent are used for the formation of the graphenes 6004. The solvent is removed by volatilization from a dispersion medium including the graphene oxides uniformly dispersed and the graphene oxides are reduced to give the graphenes; hence, the graphenes 6004 remaining in the positive electrode active material layer 6002 are partly overlapped with each other and dispersed such that surface contact is made, thereby forming a path for electron conduction.

The graphenes 6004 are partly formed so as to be three-dimensionally arranged inside the positive electrode active material layer 6002. Further, the graphenes 6004 are extremely thin films (sheets) made of a single layer of carbon molecules or stacked layers thereof and hence are in contact with part of the surfaces of the particles of the positive electrode active material 6003 in such a way as to cover these surfaces. A portion of the graphenes 6004 which is not in contact with the positive electrode active material 6003 is warped between the particles of the positive electrode active material 6003 and crimped or stretched.

Accordingly, the plurality of graphenes 6004 forms a network for electron conduction in the positive electrode 6000. Thus, the path for electron conduction between the particles of the positive electrode active material 6003 is maintained. As described above, the graphenes, whose raw material is the graphene oxide and which are formed by reduction performed after a paste is formed, are employed as a conductive additive, so that the positive electrode active material layer 6002 with high electron conductivity can be formed.

The proportion of the positive electrode active material 6003 in the positive electrode active material layer 6002 can be increased because it is not necessary to increase the added amount of the conductive additive in order to increase contact points between the positive electrode active material 6003 and the graphenes 6004. Accordingly, the discharge capacity of the secondary battery can be increased.

The average particle diameter of primary particles of the particles of the positive electrode active material 6003 is less than or equal to 500 nm, preferably greater than or equal to 50 nm and less than or equal to 500 nm. To make surface contact with the particles of the positive electrode active material 6003, the graphenes 6004 have sides the length of each of which is greater than or equal to 50 nm and less than or equal to 100 μm, preferably greater than or equal to 800 nm and less than or equal to 20 μm.

Examples of the binder (binding agent) included in the positive electrode active material layer 6002 are polyvinylidene fluoride (PVDF), polyimide, polytetrafluoroethylene, polyvinyl chloride, an ethylene-propylene-diene polymer, styrene-butadiene rubber, acrylonitrile-butadiene rubber, fluorine rubber, polyvinyl acetate, polymethyl methacrylate, polyethylene, nitrocellulose, and the like.

The above-described positive electrode active material layer 6002 preferably includes the positive electrode active material 6003 at greater than or equal to 90 wt % and less than or equal to 94 wt %, the graphenes 6004 as a conductive additive at greater than or equal to 1 wt % and less than or equal to 5 wt %, and the binder at greater than or equal to 1 wt % and less than or equal to 5 wt % with respect to the total weight of the positive electrode active material layer 6002.

[3.2. Negative Electrode]

Figure 5A:
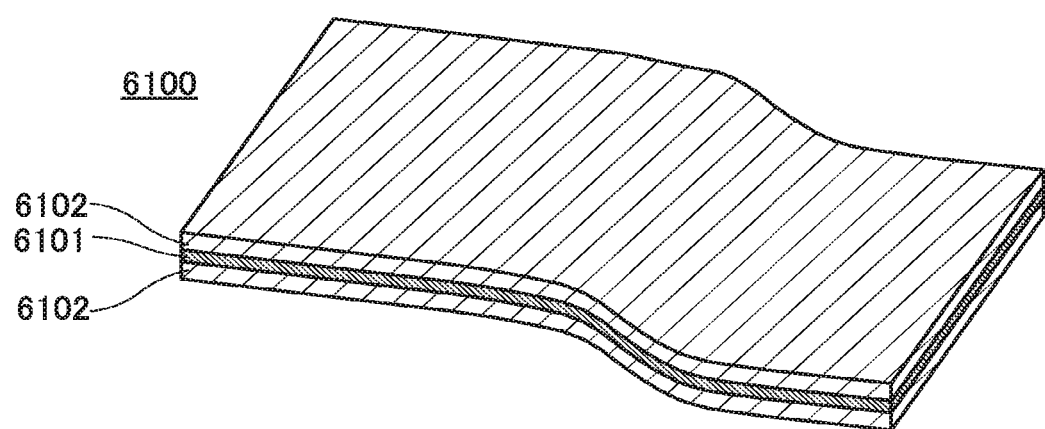
FIGS. 5A and 5B illustrate a negative electrode.

Next, a negative electrode of a secondary battery is described with reference to FIGS. 5A and 5B.

A negative electrode 6100 includes a negative electrode current collector 6101, a negative electrode active material layer 6102 formed over the negative electrode current collector 6101 by a method such as a coating method, a CVD method, or a sputtering method, and the like. Although an example of providing the negative electrode active material layer 6102 on both sides of the negative electrode current collector 6101 with a sheet shape (or a strip-like shape) is illustrated in FIG. 5A, one embodiment of the present invention is not limited to this example. The negative electrode active material layer 6102 may be provided on one side of the negative electrode current collector 6101. Further, although the negative electrode active material layer 6102 is provided entirely over the negative electrode current collector 6101 in FIG. 5A, one embodiment of the present invention is not limited thereto. The negative electrode active material layer 6102 may be provided over part of the negative electrode current collector 6101. For example, a structure may be employed in which the negative electrode active material layer 6102 is not provided in a portion where the negative electrode current collector 6101 is connected to a terminal.

The negative electrode current collector 6101 can be formed using a highly conductive material which is not alloyed with a carrier ion of lithium or the like, such as a metal typified by gold, platinum, iron, copper, or titanium, or an alloy thereof (typified by stainless steel). Alternatively, the negative electrode current collector 6101 may be formed using a metal which forms silicide by reacting with silicon. Examples of the metal which forms silicide by reacting with silicon include zirconium, titanium, hafnium, vanadium, niobium, tantalum, chromium, molybdenum, tungsten, cobalt, nickel, and the like. The negative electrode current collector 6101 can have a foil-like shape, a plate-like shape (sheet-like shape), a net-like shape, a punching-metal shape, an expanded-metal shape, or the like as appropriate. The negative electrode current collector 6101 preferably has a thickness of greater than or equal to 10 μm and less than or equal to 30 μm.

Figure 5B:
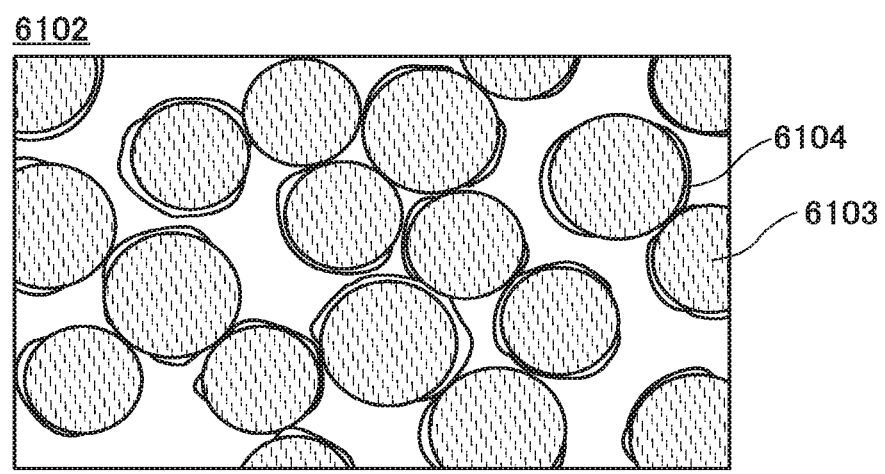

FIG. 5B is a diagram schematically illustrating a cross-section of the negative electrode active material layer 6102. Although an example of the negative electrode active material layer 6102 including a negative electrode active material 6103 and a binder (binding agent) (not illustrated) is shown here, one embodiment of the present invention is not limited to this example. It is sufficient that the negative electrode active material layer 6102 includes at least the negative electrode active material 6103.

There is no particular limitation on the material of the negative electrode active material 6103 as long as it is a material with which a metal can be dissolved and precipitated or a material into and from which metal ions can be inserted and extracted. Other than a lithium metal, graphite, which is a carbon material generally used in the field of power storage, can also be used as a material of the negative electrode active material 6103. Examples of graphite are low crystalline carbon such as soft carbon and hard carbon and high crystalline carbon such as natural graphite, kish graphite, pyrolytic carbon, mesophase pitch based carbon fiber, meso-carbon microbeads (MCMB), mesophase pitches, petroleum-based or coal-based coke, and the like.

As the negative electrode active material 6103, other than the above carbon materials, an alloy-based material which enables a charge-discharge reaction by an alloying and dealloying reaction with carrier ions can be used. In the case where carrier ions are lithium ions, for example, a material containing at least one of Mg, Ca, Al, Si, Ge, Sn, Pb, As, Sb, Bi, Ag, Au, Zn, Cd, Hg, In, and the like can be used as the alloy-based material. Such metals have higher capacity than carbon. In particular, silicon has a significantly high theoretical capacity of 4200 mAh/g. For this reason, silicon is preferably used as the negative electrode active material 6103.

Although the negative electrode active material 6103 is illustrated as a particulate substance in FIG. 5B, the shape of the negative electrode active material 6103 is not limited thereto. The negative electrode active material 6103 can have a given shape such as a plate shape, a rod shape, a cylindrical shape, a powder shape, or a flake shape. Further, the negative electrode active material 6103 may have unevenness or fine unevenness on its surface, or may be porous.

The negative electrode active material layer 6102 may be formed by a coating method in such a manner that a conductive additive (not illustrated) and a binding agent are added to the negative electrode active material 6103 to form a negative electrode paste and the negative electrode paste is applied onto the negative electrode current collector 6101 and then dried.

The negative electrode active material layer 6102 may be predoped with lithium in such a manner that a lithium layer is formed on a surface of the negative electrode active material layer 6102 by a sputtering method. Alternatively, lithium foil is provided on the surface of the negative electrode active material layer 6102, whereby the negative electrode active material layer 6102 can be predoped with lithium.

Further, graphene (not illustrated) is preferably formed on a surface of the negative electrode active material 6103. In the case of using silicon as the negative electrode active material 6103, the volume of silicon is greatly changed due to occlusion and release of carrier ions in charge-discharge cycles. Thus, adhesion between the negative electrode current collector 6101 and the negative electrode active material layer 6102 is decreased, resulting in degradation of battery characteristics caused by charge and discharge. In view of this, graphene is preferably formed on a surface of the negative electrode active material 6103 containing silicon because even when the volume of silicon is changed in charge-discharge cycles, decrease in adhesion between the negative electrode current collector 6101 and the negative electrode active material layer 6102 can be suppressed, which makes it possible to reduce degradation of battery characteristics.

Graphene formed on the surface of the negative electrode active material 6103 can be formed by reducing graphene oxide in a similar manner to that of the method for forming the positive electrode. As the graphene oxide, the above-described graphene oxide can be used.

Further, a coating film 6104 of oxide or the like may be formed on the surface of the negative electrode active material 6103. A coating film formed by decomposition of an electrolyte solution or the like in charging cannot release electric charges used at the time of forming the coating film, and therefore forms irreversible capacity. In contrast, the coating film 6104 of oxide or the like provided on the surface of the negative electrode active material 6103 in advance can reduce or prevent generation of irreversible capacity.

As the film 6104 covering the negative electrode active material 6103, an oxide film of any one of niobium, titanium, vanadium, tantalum, tungsten, zirconium, molybdenum, hafnium, chromium, aluminum, and silicon or an oxide film containing any one of these elements and lithium can be used. The film 6104 is denser than a conventional film formed on a surface of a negative electrode with a decomposition product of an electrolyte solution.

For example, niobium oxide ($Nb_2O_5$) has a low electric conductivity of $10^{-9}$ S/cm and a high insulating property. For this reason, a niobium oxide film inhibits electrochemical decomposition reaction between the negative electrode active material and the electrolyte solution. On the other hand, niobium oxide has a lithium diffusion coefficient of $10^{-9}$ cm$^2$/sec and high lithium ion conductivity. Therefore, niobium oxide can transmit lithium ions.

The film 6104 covering the negative electrode active material 6103 can be formed by a sol-gel method, for example. The sol-gel method is a method for forming a thin film in such a manner that a solution of metal alkoxide, a metal salt, or the like is changed into a gel, which has lost its fluidity, by hydrolysis reaction and polycondensation reaction and the gel is baked. Since a thin film is formed from a liquid phase in the sol-gel method, raw materials can be mixed uniformly on the molecular scale. For this reason, by adding a negative electrode active material such as graphite to a raw material of the metal oxide film which is a solvent, the active material can be easily dispersed into the gel. In this manner, the film 6104 can be formed on the surface of the negative electrode active material 6103.

The use of the film 6104 can prevent a decrease in capacity of the secondary battery.

[3.3. Electrolyte Solution]

As a solvent for an electrolyte solution used in a secondary battery, an aprotic organic solvent is preferably used. For example, one of ethylene carbonate (EC), propylene carbonate (PC), butylene carbonate, chloroethylene carbonate, vinylene carbonate, γ-butyrolactone, γ-valerolactone, dimethyl carbonate (DMC), diethyl carbonate (DEC), ethyl methyl carbonate (EMC), methyl formate, methyl acetate, methyl butyrate, 1,3-dioxane, 1,4-dioxane, dimethoxyethane (DME), dimethyl sulfoxide, diethyl ether, methyl diglyme, acetonitrile, benzonitrile, tetrahydrofuran, sulfolane, and sultone can be used, or two or more of these solvents can be used in an appropriate combination in an appropriate ratio.

By gelling with a high-molecular material as the solvent for the electrolyte solution, safety against liquid leakage and the like is improved. Further, a secondary battery can be thinner and more lightweight. Typical examples of the high-molecular material are silicone, polyacrylamide, polyacrylonitrile, polyethylene oxide, polypropylene oxide, a fluorine-based polymer, and the like.

Alternatively, the use of one or more ionic liquids (room temperature molten salts) which are less likely to burn and volatilize as the solvent for the electrolyte solution can prevent the secondary battery from exploding or catching fire even when the secondary battery internally shorts out or the internal temperature increases due to overcharging or the like.

As an electrolyte dissolved in the above-described solvent, in the case of using lithium ions as carrier ions, one of lithium salts such as $LiPF_6$, $LiClO_4$, $LiAsF^6$, $LiBF_4$, $LiAlCl_4$, LiSCN, LiBr, LiI, $Li_2SO_4$, $Li_2B_{10}C_{10}$, $Li_2B_{12}Cl_{12}$, $LiCF_3SO_3$, $LiC_4F_9SO_3$, $LiC(CF_3SO_2)_3$, $LiC(C_2F_5SO_2)_3$, $LiN(CF_3SO_2)_2$, $LiN(C_4F_9SO_2)$ $(CF_3SO_2)$, and $LiN(C_2F_5SO_2)_2$ can be used, or two or more of these lithium salts can be used in an appropriate combination in an appropriate ratio.

[3.4. Separator]

As a separator of a secondary battery, a porous insulator such as cellulose, polypropylene (PP), polyethylene (PE), polybutene, nylon, polyester, polysulfone, polyacrylonitrile, polyvinylidene fluoride, or tetrafluoroethylene can be used. Further, nonwoven fabric of a glass fiber or the like, or a diaphragm in which a glass fiber and a polymer fiber are mixed may also be used.

[3.5. Nonaqueous Secondary Battery]

Next, structures of nonaqueous secondary batteries are described with reference to FIGS. 6A and 6B and FIGS. 7A and 7B.

[3.5.1. Laminated Secondary Battery]

Figure 6A:
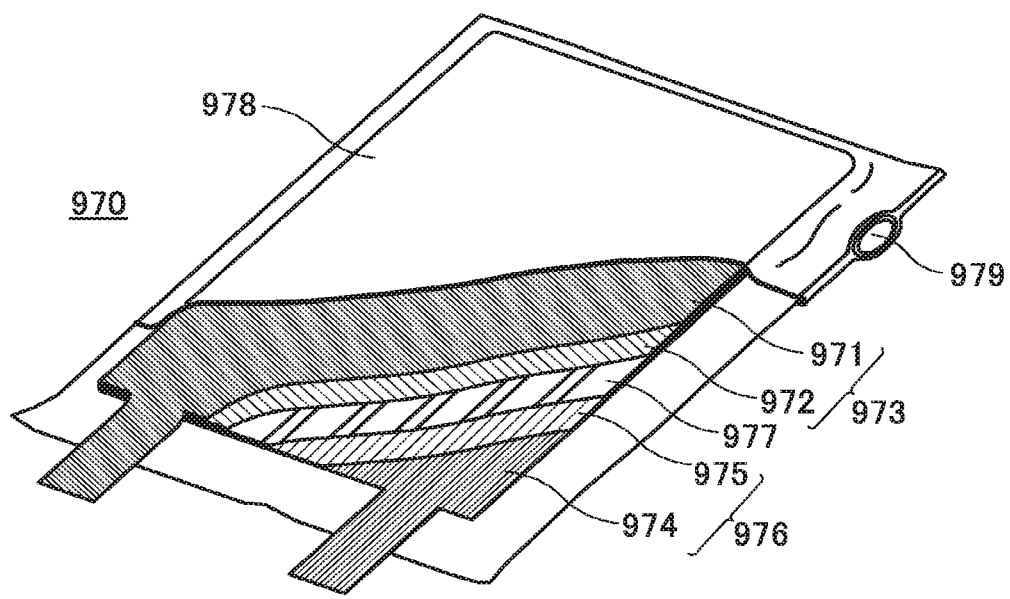
FIGS. 6A and 6B each illustrate a secondary battery.

Next, an example of a laminated secondary battery is described with reference to FIG. 6A. In FIG. 6A, a structure inside the laminated secondary battery is partly exposed for convenience of explanation.

A laminated secondary battery 970 illustrated in FIG. 6A includes a positive electrode 973 including a positive electrode current collector 971 and a positive electrode active material layer 972, a negative electrode 976 including a negative electrode current collector 974 and a negative electrode active material layer 975, a separator 977, an electrolyte solution (not illustrated), and an exterior body 978. The separator 977 is placed between the positive electrode 973 and the negative electrode 976 provided in the exterior body 978. The exterior body 978 is filled with the electrolyte solution. Although the one positive electrode 973, the one negative electrode 976, and the one separator 977 are used in FIG. 6A, the secondary battery may have a stacked-layer structure in which positive electrodes, negative electrodes, and separators are alternately stacked.

The exterior body 978 of the secondary battery 970 is provided with an electrolyte solution injection and expelling opening 979.

For the positive electrode, the negative electrode, the separator, and the electrolyte solution (an electrolyte and a solvent), the above-described respective members can be used.

In the laminated secondary battery 970 illustrated in FIG. 6A, the positive electrode current collector 971 and the negative electrode current collector 974 also serve as terminals (tabs) for electrical contacts with the outside. For this reason, the positive electrode current collector 971 and the negative electrode current collector 974 are provided so that part of the positive electrode current collector 971 and part of the negative electrode current collector 974 are exposed outside the exterior body 978.

As the exterior body 978 of the laminated secondary battery 970, for example, a laminate film having a three-layer structure where a highly flexible metal thin film of aluminum, stainless steel, copper, nickel, or the like is provided over a film formed of a material such as polyethylene, polypropylene, polycarbonate, ionomer, or polyamide, and an insulating synthetic resin film of a polyamide resin, a polyester resin, or the like is provided as the outer surface of the exterior body over the metal thin film can be used. With such a three-layer structure, permeation of the electrolyte solution and a gas can be blocked and an insulating property and resistance to the electrolyte solution can be obtained.

Here, the operating principle of secondary batteries is described using a lithium-ion secondary battery as an example. As a positive electrode active material, any of the materials given as examples for the positive electrode active material 6003 may be used. Here, $LiFePO_4$ is used as an example. As a negative electrode active material, any of the materials given as examples for the negative electrode active material 6103 may be used. Here, graphite is used as an example.

Figure 12:
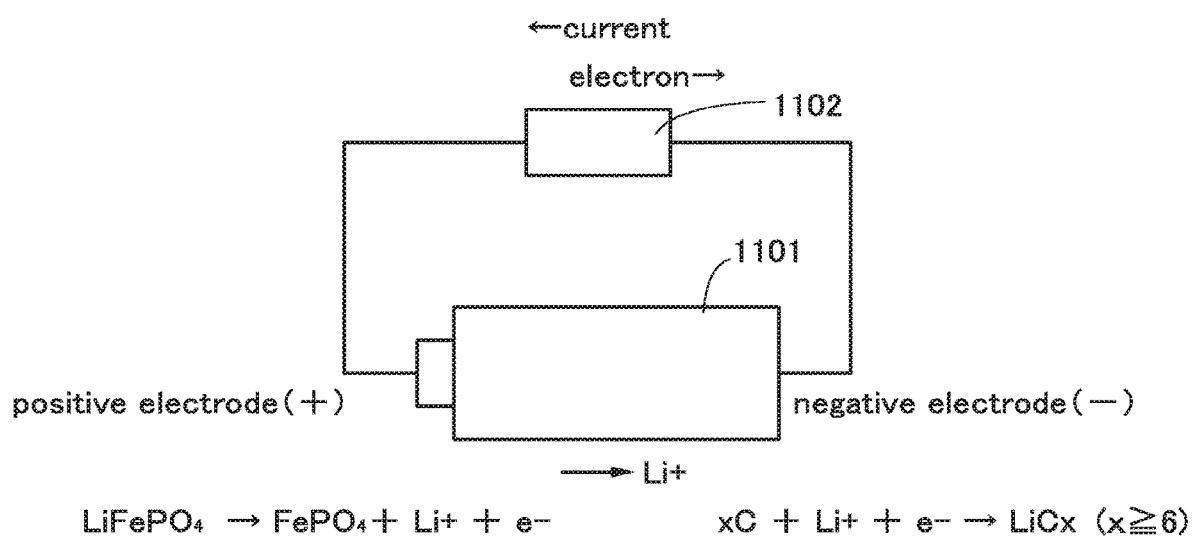
FIG. 12 is a schematic diagram of a secondary battery at the time of charging.

FIG. 12 illustrates connections between a lithium-ion secondary battery 1101 and a charger 1102 in the case of charging the lithium-ion secondary battery. In the case of charging the lithium-ion secondary battery, a reaction of Formula (1) occurs at a positive electrode.

$$LiFePO_4 \rightarrow FePO_4 + Li^+ + e^- \qquad (1)$$

A reaction of Formula (2) occurs at a negative electrode.

$$xC + Li^+ + e^- \rightarrow LiC_x (x \geq 6) \qquad (2)$$

Figure 13:
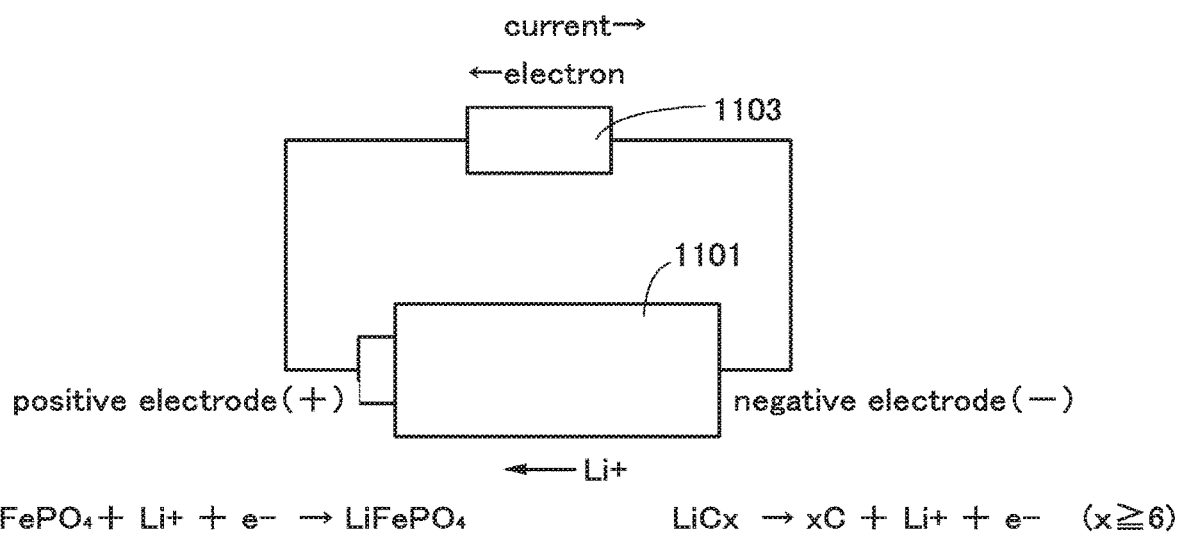
FIG. 13 is a schematic diagram of a secondary battery at the time of discharging.

FIG. 13 illustrates connections between the lithium-ion secondary battery 1101 and a load 1103 in the case of discharging the lithium-ion secondary battery. In the case of discharging the lithium-ion secondary battery, a reaction of Formula (3) occurs at the positive electrode.

$$FePO_4 + Li^+ + e^- \rightarrow LiFePO_4 \qquad (3)$$

A reaction of Formula (4) occurs at the negative electrode.

$$LiC_x \rightarrow xC + Li^+ + e^- (x \geq 6) \qquad (4)$$

[3.5.2. Cylindrical Secondary Battery]

Figure 7A:
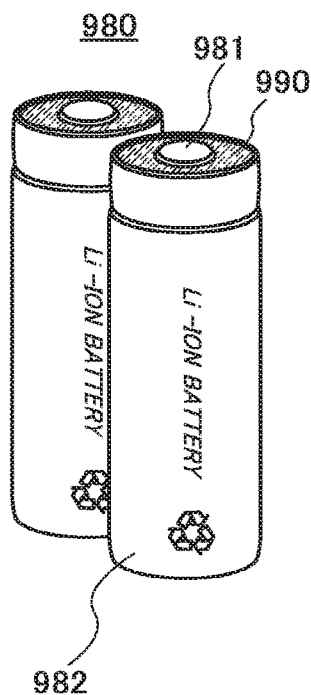
FIGS. 7A and 7B illustrate a secondary battery.

Next, an example of a cylindrical secondary battery is described with reference to FIGS. 7A and 7B. As illustrated in FIG. 7A, a cylindrical secondary battery 980 includes a positive electrode cap (battery cap) 981 on its top surface and a battery can (outer can) 982 on its side surface and bottom surface. The positive electrode cap 981 and the battery can 982 are insulated from each other with a gasket (insulating packing) 990.

Figure 7B:
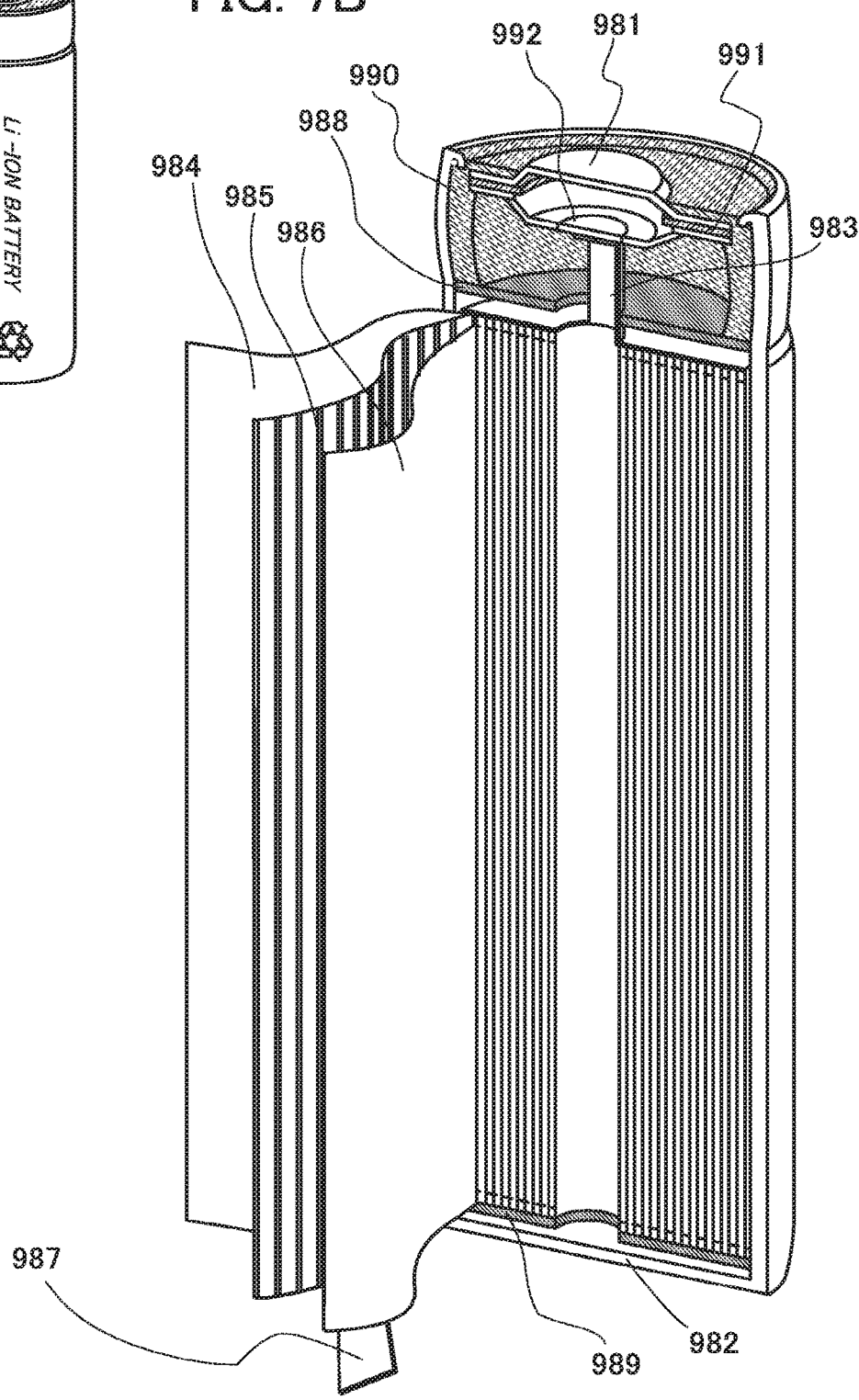

FIG. 7B is a diagram schematically illustrating a cross-section of the cylindrical secondary battery. In the battery can 982 with a hollow cylindrical shape, a battery element is provided in which a strip-like positive electrode 984 and a strip-like negative electrode 986 are wound with a separator 985 provided therebetween. Although not illustrated, the battery element is wound around a center pin as a center. One end of the battery can 982 is close and the other end thereof is open.

For the positive electrode 984, the negative electrode 986, and the separator 985, the above-described members can be used.

For the battery can 982, a metal having corrosion resistance to an electrolyte solution, such as nickel, aluminum, or titanium, an alloy of such a metal, or an alloy of such a metal and another metal (e.g., stainless steel) can be used. Alternatively, the battery can 982 is preferably coated with nickel, aluminum, or the like in order to prevent corrosion by the electrolyte solution caused by charge and discharge of the secondary battery. Inside the battery can 982, the battery element in which the positive electrode, the negative electrode, and the separator are wound is provided between a pair of insulating plates 988 and 989 which face each other.

An electrolyte solution (not illustrated) is injected inside the battery can 982 in which the battery element is provided. For the electrolyte solution, the above-described electrolyte and solvent can be used.

Since the positive electrode 984 and the negative electrode 986 of the cylindrical secondary battery are wound, active material layers are formed on both sides of the current collectors. A positive electrode terminal (positive electrode current collecting lead) 983 is connected to the positive electrode 984, and a negative electrode terminal (negative electrode current collecting lead) 987 is connected to the negative electrode 986. A metal material such as aluminum can be used for both the positive electrode terminal 983 and the negative electrode terminal 987. The positive electrode terminal 983 and the negative electrode terminal 987 are resistance-welded to a safety valve mechanism 992 and the bottom of the battery can 982, respectively. The safety valve mechanism 992 is electrically connected to the positive electrode cap 981 through a positive temperature coefficient (PTC) element 991. In the case where an internal pressure of the battery is increased to exceed a predetermined threshold value, the safety valve mechanism 992 electrically disconnects the positive electrode cap 981 and the positive electrode 984. The PTC element 991 is a heat sensitive resistor whose resistance increases as temperature rises, and controls the amount of current by an increase in resistance to prevent abnormal heat generation. Note that barium titanate (BaTiO$_3$)-based semiconductor ceramic or the like can be used for the PTC element.

[3.5.3. Rectangular Secondary Battery]

Figure 6B:
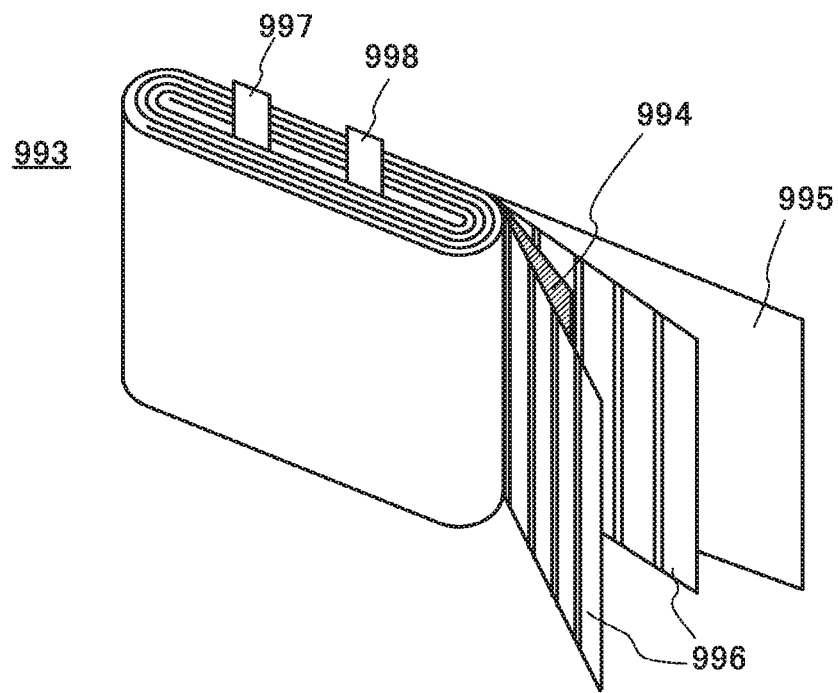

Next, an example of a rectangular secondary battery is described with reference to FIG. 6B. A wound body 993 illustrated in FIG. 6B includes a negative electrode 994, a positive electrode 995, and a separator 996. The wound body 993 is obtained by winding a sheet of a stack in which the negative electrode 994 overlaps with the positive electrode 995 with the separator 996 provided therebetween. The wound body 993 is covered with a rectangular sealed can or the like; thus, a rectangular secondary battery is formed. Note that the number of stacks each including the negative electrode 994, the positive electrode 995, and the separator 996 may be determined as appropriate depending on capacity and an element volume which are required.

As in the cylindrical secondary battery, the negative electrode 994 is connected to a negative terminal of an exterior body (not illustrated) through one of a terminal 997 and a terminal 998, and the positive electrode 995 is connected to a positive terminal of the exterior body (not illustrated) through the other of the terminal 997 and the terminal 998. Surrounding structures such as a safety valve mechanism are similar to those in the cylindrical secondary battery.

Although the laminated secondary battery, the cylindrical secondary battery, and the rectangular secondary battery are described above as examples of the secondary battery, secondary batteries having a variety of shapes such as a coin-type secondary battery can be used. Further, a structure in which a plurality of positive electrodes, a plurality of negative electrodes, and a plurality of separators are stacked or wound may be employed.

[3.6. Lithium-Ion Capacitor]

Next, a lithium-ion capacitor which is one example of power storage devices is described.

The lithium-ion capacitor is a hybrid capacitor which combines a positive electrode of an electric double layer capacitor (EDLC) and a negative electrode of a lithium-ion secondary battery using a carbon material, and also an asymmetric capacitor in which the principles of power storage are different between the positive electrode and the negative electrode. The positive electrode forms an electric double layer and enables charge and discharge by a physical action, whereas the negative electrode enables charge and discharge by a chemical action of lithium. With the use of a negative electrode in which lithium is occluded in advance in the carbon material or the like that is a negative electrode active material, the lithium-ion capacitor can have energy density dramatically higher than that of a conventional electric double layer capacitor including a negative electrode using active carbon.

In a lithium-ion capacitor, instead of a positive electrode active material layer in a lithium-ion secondary battery, a material that can reversibly adsorb at least one of lithium ions and anions is used. Examples of such a material are active carbon, a conductive high-molecular compound, and a polyacenic semiconductor (PAS).

The lithium-ion capacitor has high efficiency of charge and discharge, capability of rapidly performing charge and discharge, and a long lifetime even when it is repeatedly used.

As described above, one embodiment of the present invention can be applied to the lithium-ion capacitor. Accordingly, a power storage device with high output and long lifetime can be provided.

[3.7. Secondary Battery Including Electrical Circuit and the Like]

Next, a secondary battery including an electrical circuit and the like is described.

FIGS. 8A to 8D illustrate an example of a secondary battery in which the above-described rectangular secondary battery is provided with an electric circuit and the like. In a secondary battery 6600 illustrated in FIGS. 8A and 8B, a wound body 6601 which is the above described wound body is stored inside a battery can 6604. The wound body 6601 includes a terminal 6602 and a terminal 6603, and is impregnated with an electrolyte solution inside the battery can 6604. The terminal 6603 may be in contact with the battery can 6604, and the terminal 6602 may be insulated from the battery can 6604 with the use of an insulating member or the like. A metal material such as aluminum or a resin material can be used for the battery can 6604.

Figure 8A:
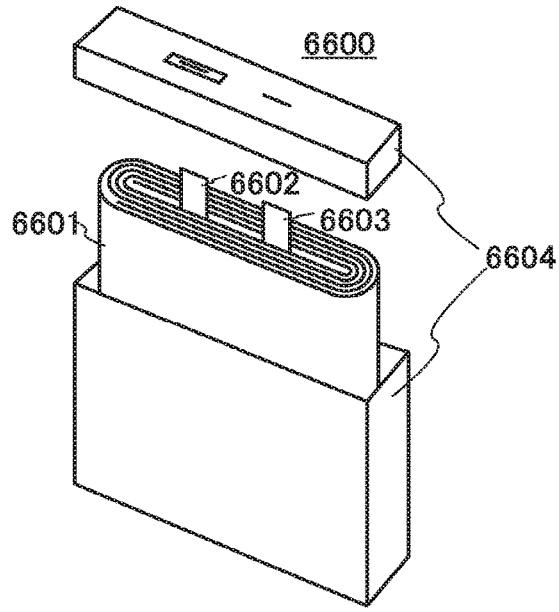
FIGS. 8A to 8D illustrate a secondary battery.
Figure 8B:
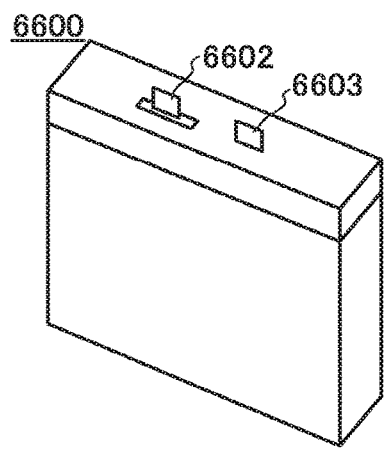
Figure 8C:
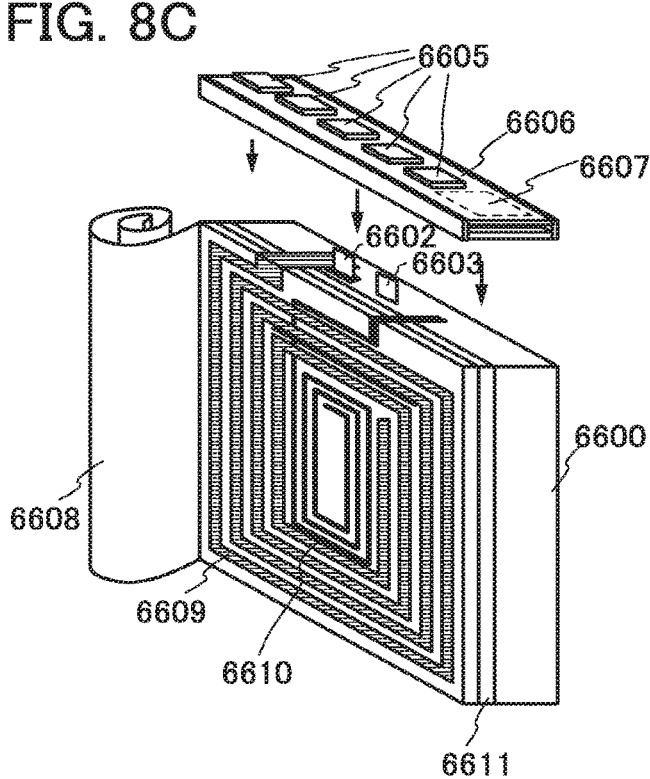
Figure 8D:
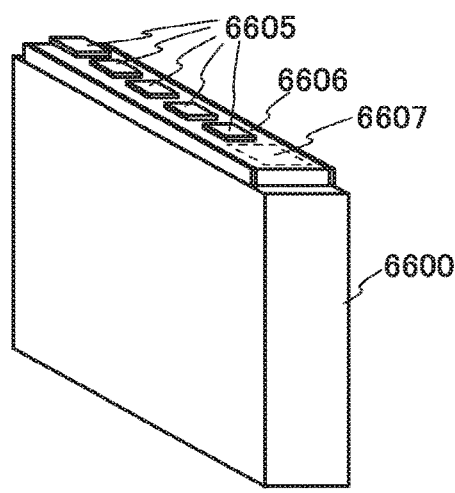

Further, as illustrated in FIG. 8B, the secondary battery 6600 can be provided with an electric circuit and the like. FIGS. 8C and 8D illustrate an example of providing the secondary battery 6600 with a circuit board 6606 in which an electric circuit and the like are provided, an antenna 6609, an antenna 6610, and a label 6608.

The circuit board 6606 includes an electric circuit 6607, terminals 6605, and the like. As the circuit board 6606, a printed circuit board (PCB) can be used, for example. When the printed circuit board is used as the circuit board 6606, electronic components such as a resistor, a capacitor, a coil (an inductor), and a semiconductor integrated circuit (IC) are mounted over the printed circuit board and connected, whereby the electric circuit 6607 can be formed. As well as the above-described electronic components, a variety of components, for example, a temperature sensing element such as a thermistor, a fuse, a filter, a crystal oscillator, and an electromagnetic compatibility (EMC) component can be mounted.

Here, a circuit including a transistor in which an oxide semiconductor described below is used in a channel formation region and the like can be used as the semiconductor integrated circuit (IC). Thus, power consumption of the electric circuit 6607 can be greatly reduced.

The electric circuit 6607 including these electronic components can function as a monitoring circuit for preventing overcharge or overdischarge of the secondary battery 6600, a protection circuit against overcurrent, or the like.

The terminals 6605 included in the circuit board 6606 are connected to the terminal 6602, the terminal 6603, the antenna 6609, the antenna 6610, and the electric circuit 6607. Although the number of the terminals 6605 is five in FIGS. 8C and 8D, the number is not limited thereto and may be a given number. With the use of the terminals 6605, the secondary battery 6600 can be charged and discharged, and further, a signal can be transmitted and received to/from an electrical device including the secondary battery 6600.

The antenna 6609 and the antenna 6610 can be used for transmitting and receiving electric power or a signal to/from the outside of the secondary battery, for example. One or both of the antenna 6609 and the antenna 6610 are electrically connected to the electric circuit 6607 to allow the electric circuit 6607 to control the transmission and reception of electric power or a signal to/from the outside. Alternatively, one or both of the antenna 6609 and the antenna 6610 are electrically connected to the terminals 6605 to allow a control circuit of the electrical device including the secondary battery 6600 to control the transmission and reception of electric power and a signal to/from the outside.

Note that although FIGS. 8C and 8D illustrate an example of the secondary battery 6600 provided with two kinds of antennas, a variety of antennas may be provided or a structure where an antenna is not provided may be employed.

In FIGS. 8C and 8D, the antenna 6609 and the antenna 6610 each have a coil shape; however, without limitation thereon, a linear antenna or a flat plate antenna may be used, for example. Further, a planar antenna, an aperture antenna, a traveling-wave antenna, an EH antenna, a magnetic-field antenna, or a dielectric antenna may be used.

Note that an electromagnetic induction method, a magnetic resonance method, an electric wave method, or the like can be used for transmitting and receiving electric power wirelessly (also referred to as contactless power transmission, non-contact power transmission, wireless power supply, or the like).

The line width of the antenna 6609 is preferably larger than that of the antenna 6610. This makes it possible to increase the amount of electric power received by the antenna 6609.

In addition, a layer 6611 is provided between the antennas 6609 and 6610 and the secondary battery 6600. The layer 6611 has a function of preventing shielding of an electric field or a magnetic field due to the wound body 6601, for example. In this case, a magnetic substance can be used for the layer 6611, for example. Alternatively, the layer 6611 may be a shielding layer.

Note that the antenna 6609 and the antenna 6610 can be used for a purpose which is different from the purpose of transmitting and receiving electric power or a signal to/from the outside. For example, when the electrical device including the secondary battery 6600 does not include an antenna, the antenna 6609 and the antenna 6610 enable wireless communication with the electrical device.

[4. Electrical Device]

The secondary battery of one embodiment of the present invention can be used as a power sources for a variety of electrical devices.

[4.1. Range of Electrical Device]

Here, electrical devices refer to industrial products including portions which operate by electric power. Electrical devices are not limited to consumer products such as home electrical products and also include products for various uses such as business use, industrial use, and military use in their range.

[4.2. Examples of Electrical Device]

Examples of electrical devices each utilizing the secondary battery of one embodiment of the present invention include the following: display devices such as televisions and monitors, lighting devices, desktop or laptop personal computers, word processors, image reproduction devices which reproduce still images or moving images stored in recording media such as digital versatile discs (DVDs), portable or stationary audio reproduction devices such as compact disc (CD) players and digital audio players, portable or stationary radio receivers, audio recording and reproduction devices such as tape recorders and IC recorders (voice recorders), headphone stereos, stereos, remote controllers, clocks such as table clocks and wall clocks, cordless phone handsets, transceivers, cellular phones, car phones, portable or stationary game machines, pedometers, calculators, portable information terminals, electronic notebooks, e-book readers, electronic translators, audio input devices such as microphones, cameras such as still cameras and video cameras, toys, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashing machines, dish drying machines, clothes dryers, futon dryers, electric refrigerators, electric freezers, electric refrigerator-freezers, freezers for preserving DNA, flashlights, electric power tools, smoke detectors, health and medical equipment such as hearing aids, cardiac pacemakers, portable X-ray equipment, radiation counters, electric massagers, and dialyzers. Examples also include industrial equipment such as guide lights, traffic lights, meters such as gas meters and water meters, belt conveyors, elevators, escalators, automatic vending machines, automatic ticket machines, cash dispensers (CD), automated teller machines (ATM), digital signage, industrial robots, radio relay stations, cellular phone base stations, power storage systems, and secondary batteries for leveling the amount of power supply and smart grid. In addition, moving objects (transportation objects) driven by electric motors using electric power from the secondary batteries are also included in the range of electrical devices. Examples of the moving objects are electric vehicles (EV), hybrid electric vehicles (HEV) which include both an internal-combustion engine and a motor, plug-in hybrid electric vehicles (PHEV), tracked vehicles in which caterpillar tracks are substituted for wheels of these vehicles, agricultural machines, motorized bicycles including motor-assisted bicycles, motorcycles, electric wheelchairs, electric carts, boats or ships, submarines, aircrafts such as fixed-wing aircraft and rotary-wing aircraft, rockets, artificial satellites, space probes, planetary probes, and spacecrafts.

In the electrical devices, the secondary battery of one embodiment of the present invention can be used as a main power source for supplying enough electric power for almost the whole power consumption. Alternatively, in the above electrical devices, the secondary battery of one embodiment of the present invention can be used as an uninterruptible power source which can supply power to the electrical devices when the supply of power from the main power source or a commercial power source is stopped. Still alternatively, in the electrical devices, the secondary battery of one embodiment of the present invention can be used as an auxiliary power source for supplying electric power to the electrical devices at the same time as the power supply from the main power source or a commercial power source.

[4.3. Example of Electric Power Network]

The electrical devices may each include a secondary battery or may be connected wirelessly or with a wiring to one or more secondary batteries and a control device controlling power systems of these devices to form a power system network (electric power network). The power system network controlled by the control device can improve efficiency in the use of electric power in the whole network.

Figure 9A:
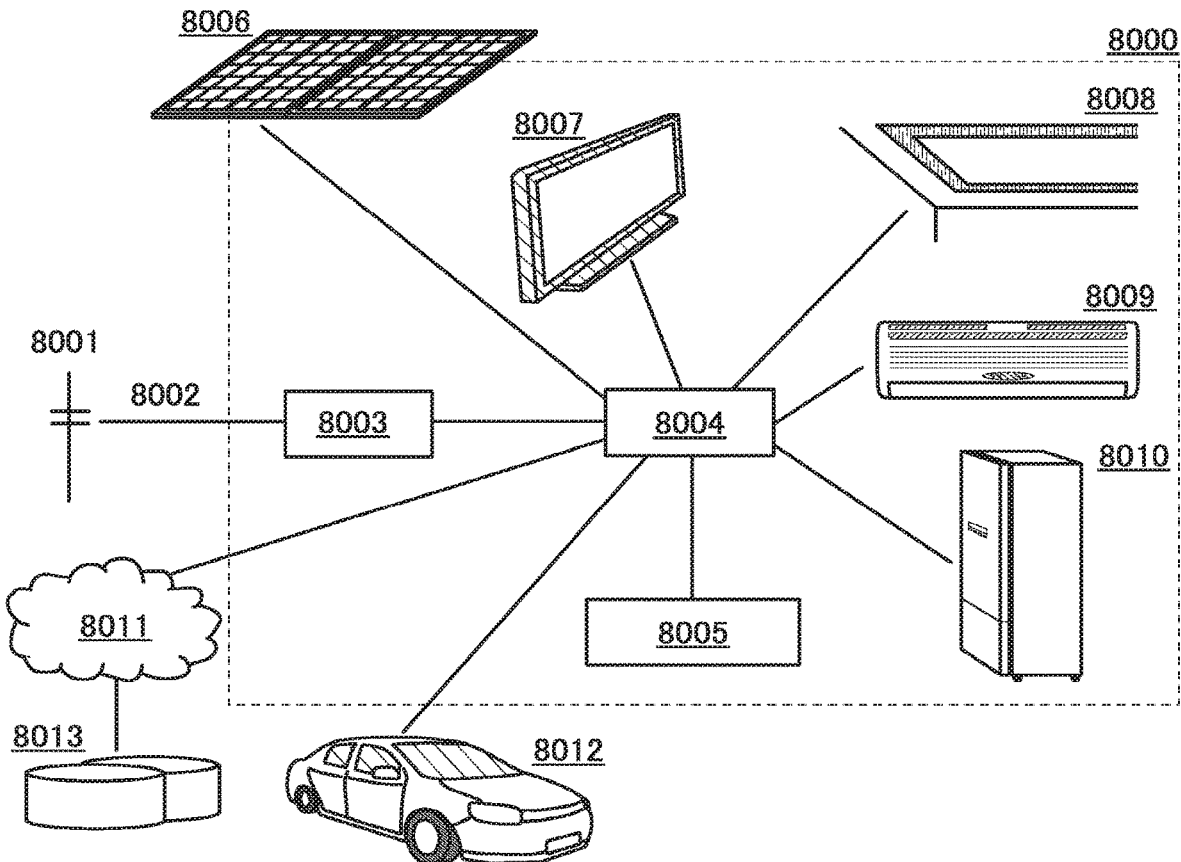
FIGS. 9A to 9C illustrate electrical devices.

FIG. 9A illustrates an example of a home energy management system (HEMS) in which a plurality of home appliances, a control device, a secondary battery, and the like are connected in a house. Such a system makes it possible to check easily the power consumption of the whole house. In addition, the plurality of home appliances can be operated with a remote control. In the case of automatically controlling the home appliances with a sensor or the control device, such a system can contribute to power saving.

A distribution board 8003 set in a house 8000 is connected to an electric power system 8001 through a service wire 8002. The distribution board 8003 supplies AC power which is electric power supplied from a commercial power source through the service wire 8002 to each of the plurality of home appliances. A control device 8004 is connected to the distribution board 8003 and also connected to the plurality of home appliances, a power storage system 8005, a solar power generation system 8006, and the like. Further, the control device 8004 can also be connected to an electric vehicle 8012 which is parked outside the house 8000 or the like and operates independently of the distribution board 8003.

The control device 8004 connects the distribution board 8003 to the plurality of home appliances to form a network, and controls the operation of the plurality of home appliances connected to the network.

In addition, the control device 8004 is connected to the Internet 8011 and thus can be connected to a management server 8013 through the Internet 8011. The management server 8013 receives data on status of use of electric power by users and therefore can create a database and can provide the users with a variety of services based on the database. Further, as needed, the management server 8013 can provide the users with data on electric power charge for a corresponding time zone, for example. On the basis of the data, the control device 8004 can set an optimized usage pattern in the house 8000.

Examples of the plurality of home appliances are a display device 8007, a lighting device 8008, an air-conditioning system 8009, and an electric refrigerator 8010 which are illustrated in FIG. 9A. However, it is needless to say that the plurality of home appliances are not limited to these examples and refer to a variety of electrical devices which can be set inside a house, such as the above-described electrical devices.

In a display portion of the display device 8007, a semiconductor display device such as a liquid crystal display device, a light-emitting device including a light-emitting element, e.g., an organic electroluminescent (EL) element, in each pixel, an electrophoretic display device, a digital micromirror device (DMD), a plasma display panel (PDP), or a field emission display (FED) is provided, for example. A display device functioning as a display device for displaying information, such as a display device for TV broadcast reception, a personal computer, advertisement, or the like, is included in the range of the display device 8007.

The lighting device 8008 includes an artificial light source which generates light artificially by utilizing electric power. Examples of the artificial light source are an incandescent lamp, a discharge lamp such as a fluorescent lamp, and a light-emitting element such as a light-emitting diode (LED) and an organic EL element. Although being provided on a ceiling in FIG. 9A, the lighting device 8008 may be installation lighting provided on a wall, a floor, a window, or the like or desktop lighting.

The air-conditioning system 8009 has a function of adjusting an indoor environment such as temperature, humidity, and air cleanliness. FIG. 9A illustrates an air conditioner as an example. The air conditioner includes an indoor unit in which a compressor, an evaporator, and the like are integrated and an outdoor unit (not illustrated) in which a condenser is incorporated, or an integral unit thereof.

The electric refrigerator 8010 is an electrical device for the storage of food and the like at low temperature and includes a freezer for freezing at 0° C. or lower. A refrigerant in a pipe which is compressed by a compressor absorbs heat when vaporized, and thus the inside of the electric refrigerator 8010 is cooled.

The plurality of home appliances may each include a secondary battery or may use electric power supplied from the power storage system 8005 or the commercial power source without including the secondary battery. By using a secondary battery as an uninterruptible power source, the plurality of home appliances each including the secondary battery can be used even when electric power cannot be supplied from the commercial power source due to power failure or the like.

In the vicinity of a terminal for power supply in each of the above-described home appliances, an electric power sensor such as a current sensor can be provided. Data obtained with the electric power sensor is sent to the control device 8004, which makes it possible for the users to check the amount of electric power used in the whole house. In addition, on the basis of the data, the control device 8004 can determine the distribution of electric power to the plurality of home appliances, resulting in the efficient or economical use of electric power in the house 8000.

In a time zone when the proportion of electric power used to the total amount of electric power which can be supplied from the commercial power source is low, the power storage system 8005 can be charged with electric power from the commercial power source. Further, with the use of the solar power generation system 8006, the power storage system 8005 can be charged during the daytime. Note that an object to be charged is not limited to the power storage system 8005, and a secondary battery included in the electric vehicle 8012 and the secondary batteries included in the plurality of home appliances which are connected to the control device 8004 may each be the object to be charged.

Electric power stored in a variety of secondary batteries in such a manner is efficiently distributed by the control device 8004, resulting in the efficient or economical use of electric power in the house 8000.

As an example of controlling a network of a power system, the example of controlling an electric power network on a house scale is described above; however, the scale of the electric power network is not limited thereto. An electric power network on an urban scale or a national scale (also referred to as a smart grid) can be created by a combination of a control device such as a smart meter and a communication network. Further, a microgrid which is on a scale of a factory or an office and includes an energy supply source and a plant consuming electric power as units can be constructed.

[4.4. Example of Electrical Device (Example of Electric Vehicle)]

Next, as an example of the electrical devices, a moving object is described with reference to FIGS. 9B and 9C. The secondary battery of one embodiment of the present invention can be used as a secondary battery for controlling the moving object.

Figure 9B:
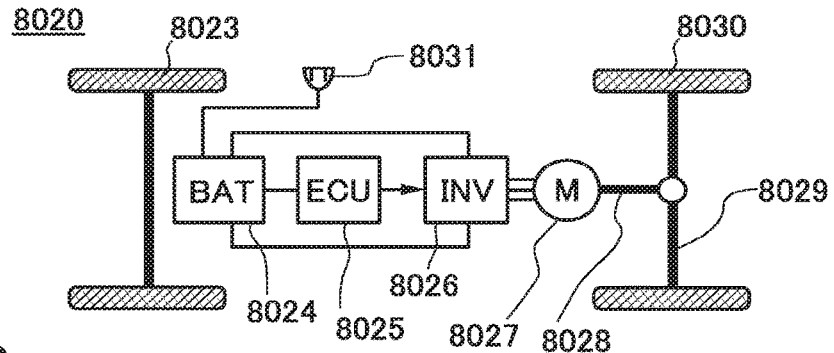
Figure 9C:
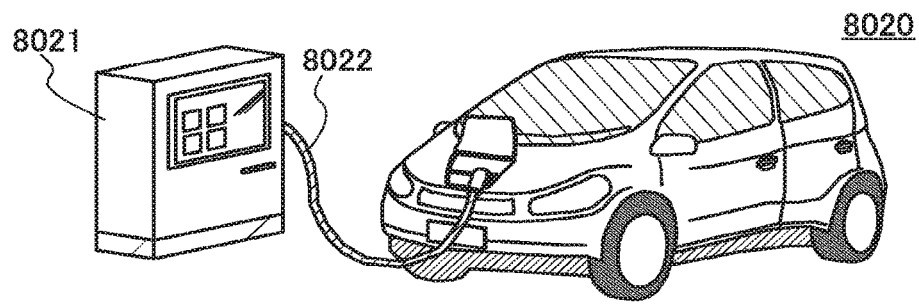

FIG. 9B illustrates an example of a structure inside an electric vehicle. An electric vehicle 8020 includes a secondary battery 8024 that can be charged and discharged. Output of electric power of the secondary battery 8024 is adjusted by an electronic control unit (ECU) 8025 so that the electric power is supplied to a drive motor unit 8027 through an inverter unit 8026. The inverter unit 8026 can convert DC power input from the secondary battery 8024 into three phase AC power, can adjust the voltage, current, and frequency of the converted AC power, and can output the AC power to the drive motor unit 8027.

Thus, when a driver presses an accelerator pedal (not illustrated), the drive motor unit 8027 works, so that torque generated in the drive motor unit 8027 is transferred to rear wheels (drive wheels) 8030 through an output shaft 8028 and a drive shaft 8029. Front wheels 8023 are operated following the rear wheels 8030, whereby the electric vehicle 8020 can be driven.

Sensors such as a voltage sensor, a current sensor, and a temperature sensor are provided in each of the units to monitor physical values of each part of the electric vehicle 8020, as appropriate.

The electronic control unit 8025 is a processing device including a memory such as a RAM or a ROM, and a CPU, which are not illustrated. The electronic control unit 8025 outputs a control signal to the inverter unit 8026, the drive motor unit 8027, or the secondary battery 8024 on the basis of operational information of the electric vehicle 8020 (e.g., acceleration, deceleration, or a stop), temperature information of a driving environment or each unit, control information, or input data on the state of charge (SOC) of the secondary battery or the like. Various data and programs are stored in the memory.

As the drive motor unit 8027, a DC motor can be used instead of the AC motor, or a combination of either of these motors and an internal-combustion engine can be used.

Note that the above-described replacement of the electrolyte solution of the secondary battery may be performed at the time of maintenance of the electric vehicle, for example. It is needless to say that one embodiment of the present invention is not limited to the moving object described above as long as the secondary battery of one embodiment of the present invention is included.

The secondary battery 8024 included in the electric vehicle 8020 can be charged by being supplied with electric power through external charging equipment by a plug-in system, a contactless power supply system, or the like. FIG. 9C illustrates the state where the secondary battery 8024 included in the electric vehicle 8020 is charged with the use of ground-based charging apparatus 8021 through a cable 8022. In charging, a given method such as CHAdeMO (registered trademark) may be referred to for a charging method, the standard of a connector, or the like as appropriate. The charging apparatus 8021 may be a charging station provided in a commerce facility or a power source in a house. For example, with the use of a plug-in technique in which a connecting plug 8031 illustrated in FIG. 9B and connected to the secondary battery 8024 is electrically connected to the charging apparatus 8021, the secondary battery 8024 included in the electric vehicle 8020 can be charged by being supplied with electric power from outside. The secondary battery 8024 can be charged by converting external electric power into DC constant voltage having a predetermined voltage level through a converter such as an AC-DC converter.

Further, although not illustrated, a power receiving device may be included in the moving object to charge the secondary battery by supplying electric power from an aboveground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission and reception of power between moving objects. Furthermore, a solar cell may be provided in an exterior of the moving object to charge the secondary battery 8024 when the electric vehicle is stopped or driven. For such contactless power supply, an electromagnetic induction method or a magnetic resonance method can be used.

Note that in the case where the moving object is an electric railway vehicle, a secondary battery included therein can be charged by being supplied with electric power from an overhead cable or a conductor rail.

With the use of the secondary battery of one embodiment of the present invention as the secondary battery 8024, the secondary battery 8024 can have high output and long lifetime, and provide improved convenience. When the secondary battery 8024 itself can be more compact and more lightweight with improved characteristics of the secondary battery 8024, the electric vehicle can be lightweight and fuel efficiency can be increased. Further, the secondary battery 8024 included in the moving object has relatively large capacity; therefore, the secondary battery 8024 can be used as an electric power supply source for indoor use, for example. In such a case, the use of a commercial power source can be avoided at peak time of electric power demand.

[4.5. Example of Electrical Device (Example of Portable Information Terminal)]

As another example of the electrical devices, a portable information terminal is described with reference to FIGS. 10A to 10C.

Figure 10A:
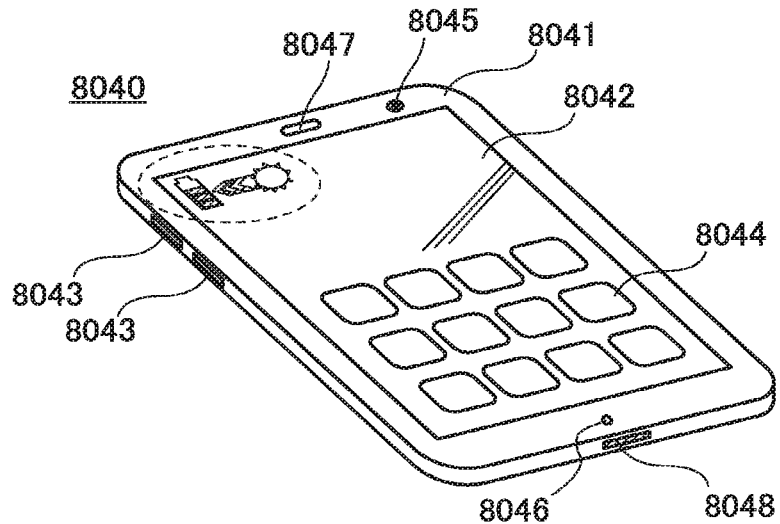
FIGS. 10A to 10C illustrate an electrical device.

FIG. 10A is a perspective view illustrating a front surface and a side surface of a portable information terminal 8040. The portable information terminal 8040 is capable of executing a variety of applications such as mobile phone calls, e-mailing, text viewing and editing, music reproduction, Internet communication, and a computer game. In the portable information terminal 8040, a housing 8041 includes a display portion 8042, a camera 8045, a microphone 8046, and a speaker 8047 on its front surface, operation buttons 8043 on its left side, and a connection terminal 8048 on its bottom surface.

A display module or a display panel is used for the display portion 8042. Examples of the display module or the display panel are a light-emitting device in which each pixel includes a light-emitting element typified by an organic light-emitting element (OLED); a liquid crystal display device; an electronic paper performing display in an electrophoretic mode, an electronic liquid powder (registered trademark) mode, or the like; a digital micromirror device (DMD); a plasma display panel (PDP); a field emission display (FED); a surface conduction electron-emitter display (SED); a light-emitting diode (LED) display; a carbon nanotube display; a nanocrystal display; and a quantum dot display.

The portable information terminal 8040 illustrated in FIG. 10A is an example in which the one display portion 8042 is provided in the housing 8041; however, one embodiment of the present invention is not limited to this example. The display portion 8042 may be provided on a rear surface of the portable information terminal 8040. Further, the portable information terminal 8040 may be a foldable portable information terminal in which two or more display portions are provided.

A touch panel with which data can be input by an instruction means such as a finger or a stylus is provided as an input means on the display portion 8042. Thus, icons 8044 displayed on the display portion 8042 can be easily operated by the instruction means. Since the touch panel is provided, a region for a keyboard on the portable information terminal 8040 is not needed and thus the display portion can be provided in a large region. Further, since data can be input with a finger or a stylus, a user-friendly interface can be obtained. Although the touch panel may be of any of various types such as a resistive type, a capacitive type, an infrared ray type, an electromagnetic induction type, and a surface acoustic wave type, the resistive type or the capacitive type is particularly preferable because the display portion 8042 can be curved. Furthermore, such a touch panel may be what is called an in-cell touch panel, in which a touch panel is combined with the display module or the display panel.

The touch panel may also function as an image sensor. In this case, for example, an image of a palm print, a fingerprint, or the like is taken with the display portion 8042 touched with the palm or the finger, whereby personal authentication can be performed. Furthermore, with the use of backlight or a sensing light source emitting near-infrared light for the display portion 8042, an image of a finger vein, a palm vein, or the like can also be taken.

Further, instead of the touch panel, a keyboard may be provided in the display portion 8042. Furthermore, both the touch panel and the keyboard may be provided.

The operation buttons 8043 can have various functions depending on the intended use. For example, the button 8043 may be used as a home button so that a home screen is displayed on the display portion 8042 by pressing the button 8043. Further, the portable information terminal 8040 may be configured such that main power source thereof is turned off with a press of the button 8043 for a predetermined time. A structure may also be employed in which the portable information terminal 8040 in a sleep mode is brought out of the sleep mode with a press of the button 8043. Besides, the button can be used as a switch for starting a variety of functions depending on the length of time of pressing or by pressing the button and another button at the same time.

Further, the button 8043 may be used as a volume control button or a mute button to have a function of adjusting the volume of the speaker 8047 for outputting sound, for example. The speaker 8047 outputs various kinds of sound, examples of which are sound that is set for predetermined processing, such as startup sound of an operating system (OS), sound from sound files executed in various applications, such as music from music reproduction application software, and an incoming e-mail alert. Although not illustrated, a connector for outputting sound to a device such as headphones, earphones, or a headset may be provided together with or instead of the speaker 8047 for outputting sound.

As described above, the buttons 8043 can have various functions. Although the number of the buttons 8043 is two in the portable information terminal 8040 in FIG. 10A, it is needless to say that the number, arrangement, position, or the like of the buttons 8043 is not limited to this example and can be designed as appropriate.

The microphone 8046 can be used for sound input and recording. Images obtained with the use of the camera 8045 can be displayed on the display portion 8042.

In addition to the operation with the touch panel provided on the display portion 8042 or the button 8043, the portable information terminal 8040 can be operated by recognition of user's movement (gesture) (also referred to as gesture input) using the camera 8045, a sensor provided in the portable information terminal 8040, or the like. Alternatively, with the use of the microphone 8046, the portable information terminal 8040 can be operated by recognition of user's voice (also referred to as voice input). By introducing a natural user interface (NUI) technique which enables data to be input to an electrical device by natural behavior of a human, the operational performance of the portable information terminal 8040 can be further improved.

The connection terminal 8048 is a terminal for inputting a signal at the time of communication with an external device or inputting electric power at the time of power supply. For example, the connection terminal 8048 can be used for connecting an external memory drive to the portable information terminal 8040. Examples of the external memory drive are storage medium drives such as an external hard disk drive (HDD), a flash memory drive, a digital versatile disc (DVD) drive, a DVD-recordable (DVD-R) drive, a DVD-rewritable (DVD-RW) drive, a compact disc (CD) drive, a compact disc recordable (CD-R) drive, a compact disc rewritable (CD-RW) drive, a magneto-optical (MO) disc drive, a floppy disk drive (FDD), and other nonvolatile solid state drive (SSD) devices. Although the portable information terminal 8040 has the touch panel on the display portion 8042, a keyboard may be provided on the housing 8041 instead of the touch panel or may be externally added.

Although the number of the connection terminal 8048 provided on the bottom surface is one in the portable information terminal 8040 in FIG. 10A, it is needless to say that the number, arrangement, position, or the like of the connection terminals is not limited to this example and can be designed as appropriate.

Figure 10B:
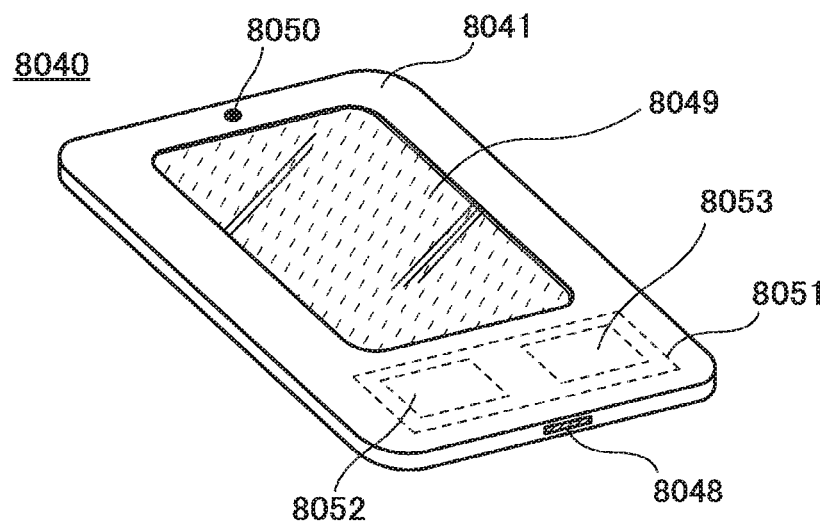

FIG. 10B is a perspective view illustrating the rear surface and the side surface of the portable information terminal 8040. In the portable information terminal 8040, the housing 8041 includes a solar cell 8049 and a camera 8050 on its rear surface; the portable information terminal 8040 further includes a charge and discharge control circuit 8051, a secondary battery 8052, a DC-DC converter 8053, and the like. FIG. 10B illustrates an example where the charge and discharge control circuit 8051 includes the secondary battery 8052 and the DC-DC converter 8053. The secondary battery 8052 of one embodiment of the present invention, which is described in the above embodiment, is used as the secondary battery 8052.

The solar cell 8049 attached on the rear surface of the portable information terminal 8040 can supply power to the display portion, the touch panel, a video signal processor, and the like. Note that the solar cell 8049 can be provided on one or both surfaces of the housing 8041. When the portable information terminal 8040 includes the solar cell 8049, the secondary battery 8052 in the portable information terminal 8040 can be charged even in a place where an electric power supply unit is not provided, such as the outdoors.

As the solar cell 8049, it is possible to use any of the following: a silicon-based solar cell including a single layer or a stacked layer of single crystal silicon, polycrystalline silicon, microcrystalline silicon, or amorphous silicon; an InGaAs-based, GaAs-based, CIS-based, $Cu_2ZnSnS_4$-based, or CdTe—CdS-based solar cell; a dye-sensitized solar cell including an organic dye; an organic thin film solar cell including a conductive polymer, fullerene, or the like; a quantum dot solar cell having a pin structure in which a quantum dot structure is formed in an i-layer with silicon or the like; and the like.

Here, an example of a structure and operation of the charge and discharge control circuit 8051 illustrated in FIG. 10B is described with reference to a block diagram in FIG. 10C.

Figure 10C:
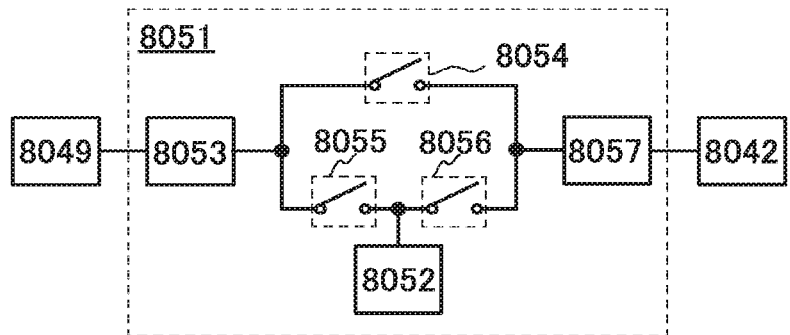

FIG. 10C illustrates the solar cell 8049, the secondary battery 8052, the DC-DC converter 8053, a converter 8057, a switch 8054, a switch 8055, a switch 8056, and the display portion 8042. The secondary battery 8052, the DC-DC converter 8053, the converter 8057, and the switches 8054 to 8056 correspond to the charge and discharge control circuit 8051 in FIG. 10B.

The voltage of electric power generated by the solar cell 8049 with the use of external light is raised or lowered by the DC-DC converter 8053 to be at a level needed for charging the secondary battery 8052. When electric power from the solar cell 8049 is used for the operation of the display portion 8042, the switch 8054 is turned on and the voltage of the electric power is raised or lowered by the converter 8057 to a voltage needed for operating the display portion 8042. In addition, when display on the display portion 8042 is not performed, the switch 8054 is turned off and the switch 8055 is turned on so that the secondary battery 8052 may be charged.

Although the solar cell 8049 is described as an example of a power generation means, the power generation means is not particularly limited thereto, and the secondary battery 8052 may be charged by another power generation means such as a piezoelectric element or a thermoelectric conversion element (Peltier element). The charging method of the secondary battery 8052 in the portable information terminal 8040 is not limited thereto, and the connection terminal 8048 may be connected to a power source to perform charge, for example. The secondary battery 8052 may be charged by a contactless power transmission module performing charge by transmitting and receiving electric power wirelessly, or any of the above charging methods may be used in combination.

Here, the state of charge (SOC) of the secondary battery 8052 is displayed on the upper left corner (in the dashed frame) of the display portion 8042. Thus, the user can check the state of charge of the secondary battery 8052 and can accordingly select a power saving mode of the portable information terminal 8040. When the user selects the power saving mode, for example, the button 8043 or the icons 8044 can be operated to switch the components of the portable information terminal 8040, e.g., the display module or the display panel, an arithmetic unit such as CPU, and a memory, to the power saving mode. Specifically, in each of the components, the use frequency of a given function is decreased to stop the use. Further, the portable information terminal 8040 can be configured to be automatically switched to the power saving mode depending on the state of charge. Furthermore, by providing a sensor such as an optical sensor in the portable information terminal 8040, the amount of external light at the time of using the portable information terminal 8040 is sensed to optimize display luminance, which makes it possible to suppress the power consumption of the secondary battery 8052.

In addition, when charging with the use of the solar cell 8049 or the like is performed, an image or the like showing that the charging is performed with the solar cell may be displayed on the upper left corner (in the dashed frame) of the display portion 8042 as illustrated in FIG. 10A.

It is needless to say that one embodiment of the present invention is not limited to the electrical device illustrated in FIGS. 10A to 10C as long as the secondary battery of one embodiment of the present invention is included.

[4.6. Example of Electrical Device (Example of Power Storage System)]

In addition, as another example of the electrical devices, a power storage system is described with reference to FIGS. 11A and 11B. A power storage system 8100 to be described here can be used at home as the power storage system 8005 described above. Here, the power storage system 8100 is described as a home-use power storage system as an example; however, it is not limited thereto and can also be used for business use or other uses.

Figure 11A:
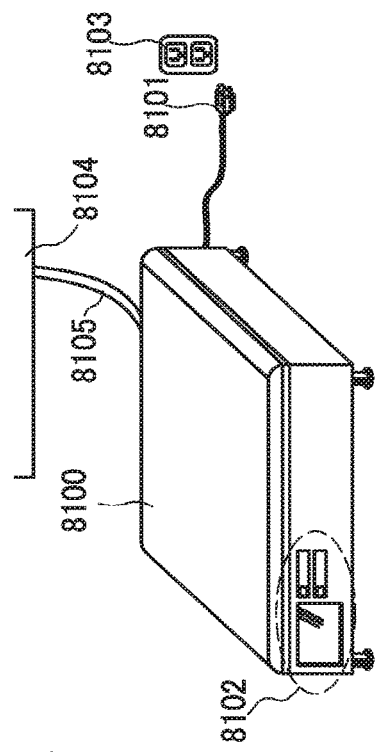
FIGS. 11A and 11B illustrate an electrical device.

As illustrated in FIG. 11A, the power storage system 8100 includes a plug 8101 for being electrically connected to a system power supply 8103. Further, the power storage system 8100 is electrically connected to a panelboard 8104 installed in home.

The power storage system 8100 may further include a display panel or the like 8102 for displaying an operation state or the like, for example. The display panel may have a touch screen. In addition, the power storage system 8100 may include a switch for turning on and off a main power source, a switch to operate the power storage system, and the like as well as the display panel.

Although not illustrated, an operation switch to operate the power storage system 8100 may be provided separately from the power storage system 8100; for example, the operation switch may be provided on a wall in a room. Alternatively, the power storage system 8100 may be connected to a personal computer, a server, or the like provided in home, in order to be operated indirectly. Still alternatively, the power storage system 8100 may be remotely operated using the Internet, an information terminal such as a smartphone, or the like. In such cases, a mechanism that performs wired or wireless communication between the power storage system 8100 and other devices is provided in the power storage system 8100.

Figure 11B:
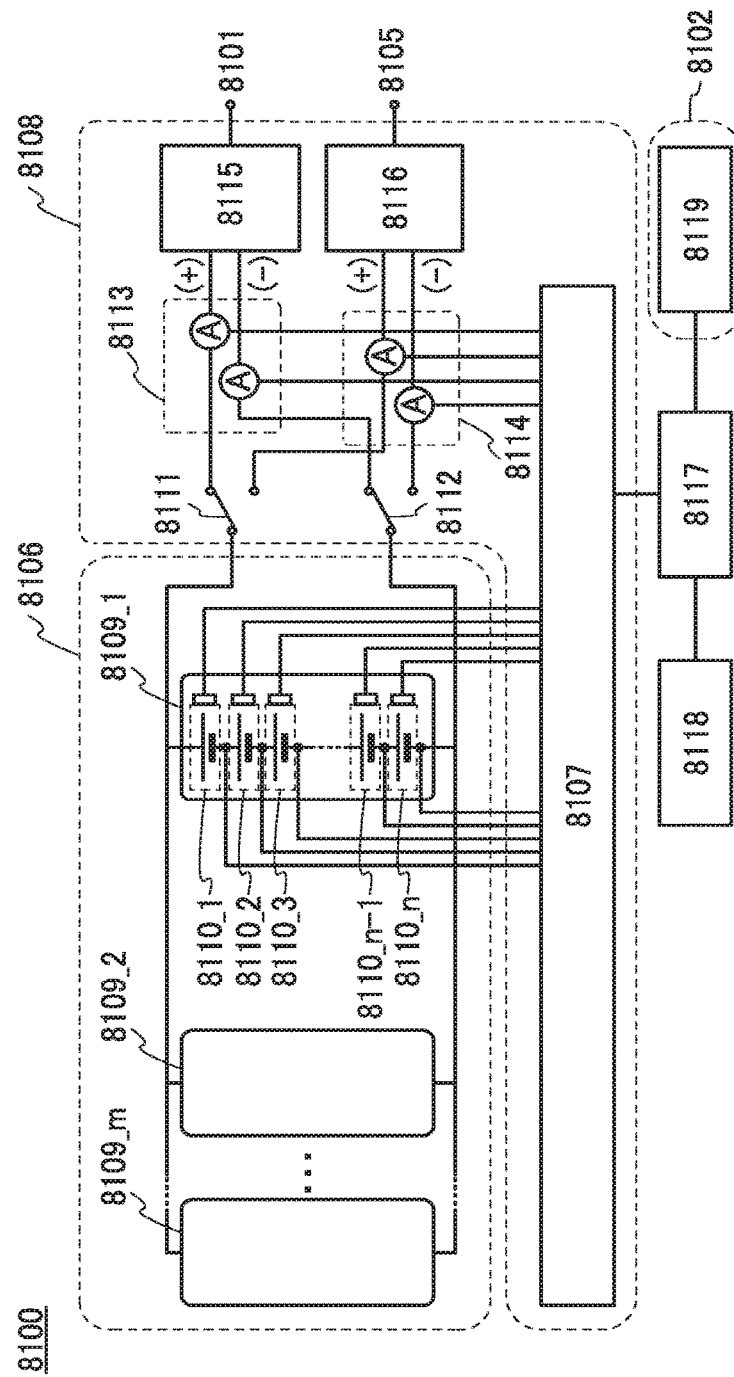

FIG. 11B illustrates an example of a circuit configuration of the power storage system 8100. The power storage system 8100 includes a secondary battery group 8106 and a battery management system (BMS) 8108.

In the secondary battery group 8106, m secondary battery units 8109_1 to 8109_*m* are connected in parallel. In each of the m secondary battery units 8109_1 to 8109_*m*, *n* secondary batteries 8110_1 to 8110_*n* are connected in series. The secondary battery of one embodiment of the present invention can be used as each of the n secondary batteries 8110_1 to 8110_*n*.

The BMS 8108 includes a battery management unit (BMU) 8107, and the BMU 8107 has functions of monitoring, controlling, and protecting the state of the secondary battery group 8106. For example, the BMU 8107 is electrically connected to the secondary batteries 8110_1 to 8110_*n* included in the secondary battery group 8106 and can collect cell voltage data. Each of the secondary batteries 8110_1 to 8110_n_ is provided with a thermistor so that the cell temperature data can be collected.

The BMS 8108 includes an AC-DC inverter 8115 and a DC-AC inverter 8116. The AC-DC inverter 8115 is electrically connected to a plug 8101, and the DC-AC inverter 8116 is electrically connected to an external connection terminal 8105. Charge and discharge of the power storage system 8100 are switched with a switch 8111 and a switch 8112. In storing power in the power storage system 8100, for example, AC power from the system power supply 8103 is converted into DC power, which is transmitted to the BMU 8107. In deriving power from the power storage system 8100, power stored in the secondary battery group 8106 is converted into AC power, which is supplied to an indoor load, for example. Note that the power may be supplied from the power storage system 8100 to the load through the panelboard 8104 as illustrated in FIG. 11A or may be directly supplied from the power storage system 8100 through wired or wireless transmission.

Note that a power source for storing power in the power storage system 8100 is not limited to the system power supply 8103 described above; for example, power may be supplied from a solar power generating system installed outside or a power storage system mounted on an electric vehicle.

The AC-DC inverter 8115 and the DC-AC inverter 8116 are connected to ammeters 8113 and 8114, and the BMU 8107 can collect data from the ammeters. Depending on these data, the BMU 8107 can monitor overcharge and overdischarge, monitor overcurrent, control a cell balancer, manage the deterioration condition of a battery, calculate the remaining battery level (the state of charge (SOC)), control a cooling fan of a driving secondary battery, or control detection of failure, for example.

The BMU 8107 is connected to a data logger 8117, and the data logger 8117 is connected to a ROM 8118. The data logger 8117 is connected to an alarm 8119 or the like, and information of the power storage system 8100 can be displayed on the display panel or the like 8102.

Note that the n secondary batteries 8110 1 to 8110_n_ may have some of or all the functions, or the m secondary battery units 8109 1 to 8109_m_ may have the functions.

Here, as an electronic circuit included in the BMU 8107, an electronic circuit including an oxide semiconductor transistor is preferably provided. In this case, power consumption of the BMU 8107 can be significantly reduced.

This application is based on Japanese Patent Application serial no. 2012-287874 filed with Japan Patent Office on Dec. 28, 2012, Japanese Patent Application serial no. 2012-287701 filed with Japan Patent Office on Dec. 28, 2012, and Japanese Patent Application serial no. 2013-047475 filed with Japan Patent Office on Mar. 11, 2013, the entire contents of which are hereby incorporated by reference.

What is claimed is:

1. A method for replacing an electrolyte solution of a secondary battery,
the secondary battery comprising:
an exterior body comprising a first opening, a second opening and a third opening; and
an electrolyte solution in the exterior body,
the method comprising the steps of:
expelling the electrolyte solution from the exterior body through the third opening by injecting an inert gas into the exterior body through the first opening;
performing filtration of the electrolyte solution expelled from the exterior body, and
injecting the electrolyte solution after the filtration into the exterior body through the second opening,
wherein the first opening and the second opening are on an upper surface of the exterior body and the third opening is on a bottom surface of the exterior body which is opposite to the upper surface, and
wherein the inert gas is expelled from the exterior body through the first opening in the step of injecting the electrolyte solution inside the exterior body.

2. The method for replacing an electrolyte solution of a secondary battery according to claim 1,
wherein the secondary battery is a lithium ion secondary battery.

3. The method for replacing an electrolyte solution of a secondary battery according to claim 1,
wherein the electrolyte solution after the filtration is mixed with at least any one of a new electrolyte solution, an electrolyte of the electrolyte solution and a solvent of the electrolyte solution before the step of injecting the electrolyte solution inside the exterior body.

4. An electrolyte solution replacement system comprising:
a secondary battery, the secondary battery comprising:
an exterior body comprising a first opening, a second opening and a third opening, and
an electrolyte solution in the exterior body; and
a filter,
wherein the first opening and the second opening are on an upper surface of the exterior body and the third opening is on a bottom surface of the exterior body which is opposite to the upper surface,
wherein the third opening is configured to expel the electrolyte solution outside the exterior body by injection of an inert gas into the exterior body through the first opening,
wherein the filter is configured to perform filtration of the electrolyte solution expelled from the third opening, and
wherein the first opening is configured to expel the inert gas when the electrolyte solution after the filtration is injected into the exterior body from the second opening.

5. The electrolyte solution replacement system according to claim 4,
wherein the secondary battery is a lithium ion battery.

6. The electrolyte solution replacement system according to claim 4,
wherein the electrolyte solution after the filtration is mixed with at least any one of a new electrolyte solution, an electrolyte of the electrolyte solution and a solvent of the electrolyte solution before injected into the exterior body.

7. The electrolyte solution replacement system according to claim 4,
wherein the secondary battery further comprises a positive electrode, a negative electrode, and a separator between the positive electrode and the negative electrode in the exterior body,
wherein the separator includes a plurality of grooves in a direction perpendicular to an installation surface for the secondary battery,
wherein the upper surface of the exterior body comprises the first opening, and wherein the plurality of grooves continuously extends from an upper edge portion of the separator adjacent to the first opening to a lower edge portion of the separator on the installation surface.

8. An electrolyte solution replacement system comprising:
a secondary battery, the secondary battery comprising:
   an exterior body comprising a first opening, a second opening and a third opening, and
   an electrolyte solution in the exterior body,
a filter connected to the second opening;
a server connected to the third opening; and
a pump between the filter and the server,
wherein the first opening and the second opening are on an upper surface of the exterior body and the third opening is on a bottom surface of the exterior body which is opposite to the upper surface,
wherein the third opening is configured to expel the electrolyte solution from the exterior body by injection of an inert gas into the exterior body through the first opening,
wherein the electrolyte solution expelled to the server is configured to be passed through the server, the pump and the filter, and
wherein the first opening is configured to expel the inert gas when the electrolyte solution passed through the filter is injected into the exterior body from the second opening.

9. The electrolyte solution replacement system according to claim 8,
wherein the secondary battery is a lithium ion battery.

10. The electrolyte solution replacement system according to claim 8,
wherein the electrolyte solution passed through the filter is mixed with at least any one of a new electrolyte solution, an electrolyte of the electrolyte solution and a solvent of the electrolyte solution before injected into the exterior body.

11. The electrolyte solution replacement system according to claim 8,
wherein the secondary battery further comprises a positive electrode, a negative electrode, and a separator between the positive electrode and the negative electrode in the exterior body,
wherein the separator includes a plurality of grooves in a direction perpendicular to an installation surface for the secondary battery,
wherein the upper surface of the exterior body comprises the first opening, and
wherein the plurality of grooves continuously extends from an upper edge portion of the separator adjacent to the first opening to a lower edge portion of the separator on the installation surface.

* * * * *